US012637130B2

(12) United States Patent
You

(10) Patent No.: US 12,637,130 B2
(45) Date of Patent: May 26, 2026

(54) ROTATING JOINT AND CHILD PRODUCT HAVING ROTATING JOINT

(71) Applicant: GOODBABY CHILD PRODUCTS CO., LTD., Kunshan (CN)

(72) Inventor: Zhigang You, Kunshan (CN)

(73) Assignee: GOODBABY CHILD PRODUCTS CO., LTD., Kunshan (CN)

( * ) Notice: Subject to any disclaimer, the term of this patent is extended or adjusted under 35 U.S.C. 154(b) by 306 days.

(21) Appl. No.: 18/293,466

(22) PCT Filed: Jun. 17, 2022

(86) PCT No.: PCT/CN2022/099295
§ 371 (c)(1),
(2) Date: Jan. 30, 2024

(87) PCT Pub. No.: WO2023/011017
PCT Pub. Date: Feb. 9, 2023

(65) Prior Publication Data
US 2024/0326890 A1     Oct. 3, 2024

(30) Foreign Application Priority Data

Aug. 4, 2021     (CN) .......................... 202110890057.3
Aug. 4, 2021     (CN) .......................... 202121811241.6

(51) Int. Cl.
*B62B 7/06*          (2006.01)
*F16C 11/04*         (2006.01)
(52) U.S. Cl.
CPC .............. *B62B 7/062* (2013.01); *F16C 11/04* (2013.01)
(58) Field of Classification Search
CPC .................................................... B62B 7/062
See application file for complete search history.

(56) References Cited

U.S. PATENT DOCUMENTS 8,205,907 B2 *   6/2012   Chicca ...................... B62B 7/08
                                                           280/643
8,714,581 B2 *   5/2014   Fritz ....................... B62B 9/245
                                                           280/643
(Continued)

FOREIGN PATENT DOCUMENTS

CN          200939896 Y          8/2007
CN          206938835 U          1/2018
(Continued)

OTHER PUBLICATIONS

International Search Report for PCT/CN2022/099295 mailed Sep. 20, 2022.

*Primary Examiner* — Erez Gurari
(74) *Attorney, Agent, or Firm* — Muncy, Geissler, Olds & Lowe, P.C.

(57)                    ABSTRACT

A rotating joint is provided, including a base, a first connecting base and a second connecting base. The first connecting base and the second connecting base are rotatably connected by a first rotating shaft. A second rotating shaft is further provided between the first connecting base, the second connecting base and the base. A first linkage unit is provided between the first connecting base and the base. A second linkage unit is provided between the second connecting base and the base. The first linkage unit coordinates with the first connecting base to rotate relative to the second connecting base when the base rotates relative to the second connecting base, and the second linkage unit coordinates with the second connecting base to rotate relative to the first connecting base when the base rotates relative to the first connecting base.

18 Claims, 19 Drawing Sheets

(56)                    References Cited

U.S. PATENT DOCUMENTS

| | | | | |
|---|---|---|---|---|
| 10,035,532 B2 * | 7/2018 | Gao | ........................ | B62B 7/062 |
| 10,322,738 B1 | 6/2019 | Wu | | |
| 11,390,311 B2 * | 7/2022 | Horst | ...................... | B62B 7/062 |
| 2009/0160162 A1 | 6/2009 | Bizzell et al. | | |
| 2011/0181024 A1 | 7/2011 | Chicca | | |
| 2013/0140797 A1 | 6/2013 | Fritz et al. | | |
| 2020/0172142 A1 * | 6/2020 | Young | ...................... | B62B 7/142 |
| 2024/0092412 A1 * | 3/2024 | Zhong | ...................... | B62B 7/064 |
| 2024/0109576 A1 * | 4/2024 | Dziak | ...................... | B62B 7/062 |
| 2024/0326890 A1 * | 10/2024 | You | ........................ | F16C 11/04 |

FOREIGN PATENT DOCUMENTS

| | | | |
|---|---|---|---|
| CN | 207550275 U | 6/2018 | |
| CN | 207697788 U | 8/2018 | |
| CN | 207747928 U | 8/2018 | |
| CN | 110901746 A | 3/2020 | |
| CN | 212172331 U | 12/2020 | |
| CN | 112706819 A | 4/2021 | |
| CN | 113734262 A | 12/2021 | |
| CN | 216140044 U | 3/2022 | |
| DE | 202013102269 U1 | 6/2013 | |
| EP | 2946985 A1 | 11/2015 | |
| EP | 3170719 A1 | 5/2017 | |
| JP | H09240480 A | 9/1997 | |
| JP | 2014073846 A | 4/2014 | |

* cited by examiner

ROTATING JOINT AND CHILD PRODUCT HAVING ROTATING JOINT

CROSS-REFERENCE TO RELATED APPLICATIONS

This application claims priority to PCT/CN2022/099295, filed on Jun. 17, 2022, which claims priority to Chinese Application No. 202110890057.3, filed on Aug. 4, 2021, and Chinese Applicaton No. 202121811241.6, filed on Aug. 4, 2021, the entire contents all of which are hereby incorporated by reference.

FIELD OF TECHNOLOGY

The following relates to the technical field of child products, and in particular to a rotating joint and a child product having the rotating joint.

BACKGROUND

In the conventional art, many child products have multiple rods that rotate with each other, which makes conversion between different states possible. Usually, if a rotating joint is connected to three or more rods that are rotatably connected to each other, the structural design of the rotating joint will become complicated, and there is no linkage relationship between the rods. The rods need to be driven and rotated separately, which causes cumbersome operation and complex structure.

SUMMARY

An aspect relates to a rotating joint with a simple structure and capable of making different rods rotate in a linked mode, and a child product having the rotating joint.

In order to achieve the above aspect, the technical solutions of the present application are as follows:

A rotating joint, including a base, a first connecting base and a second connecting base, wherein the first connecting base and the second connecting base are rotatably connected by a first rotating shaft, a second rotating shaft is further provided between the first connecting base, the second connecting base and the base, an axis of the first rotating shaft and an axis of the second rotating shaft are arranged in parallel, a first linkage unit is provided between the first connecting base and the base, and a second linkage unit is provided between the second connecting base and the base; when the base rotates, relative to the second connecting base, around the second rotating shaft in a first direction, the first linkage unit coordinates with the first connecting base to rotate, relative to the second connecting base, around the first rotating shaft in a second direction which is opposite to the first direction; and when the base rotates, relative to the first connecting base, around the second rotating shaft in the second direction, the second linkage unit coordinates with the second connecting base to rotate, relative to the first connecting base, around the first rotating shaft in the first direction.

Further, the first linkage unit includes a first pin provided on the base and a first sliding groove formed in the first connecting base, the first pin is slidably and rotatably inserted in the first sliding groove, and an axis of the first pin is arranged parallel to the axis of the first rotating shaft or the axis of the second rotating shaft; and/or, the second linkage unit includes a second pin provided on the base and a second sliding groove formed in the second connecting base, the second pin is slidably and rotatably inserted in the second sliding groove, and an axis of the second pin is arranged parallel to the axis of the first rotating shaft or the axis of the second rotating shaft.

According to some embodiments of the present application, the first pin is fixedly provided on the base, a first groove is formed in the first connecting base at a position corresponding to the first pin and along a rotationally extending direction of the first pin, and an end of the first groove is connected with an end of the first sliding groove; and/or, the second pin is fixedly provided on the base, a second groove is formed in the second connecting base at a position corresponding to the second pin and along a rotationally extending direction of the second pin, and an end of the second groove is connected with an end of the second sliding groove.

Further, the first groove and the second groove are respectively located above the first rotating shaft.

Further, when the base rotates relative to the second connecting base, the first pin relatively slides and rotates in the first sliding groove, the first connecting base is then driven to rotate relative to the second connecting base, and the second pin slides in the second groove along a longitudinal direction of the second groove; when the base rotates relative to the first connecting base, the second pin relatively slides and rotates in the second sliding groove, the second connecting base is then driven to rotate relative to the first connecting base, and the first pin slides in the first groove along a longitudinal direction of the first groove.

According to some embodiments of the present application, the first pin and the second pin are respectively located on two sides of the second rotating shaft, and the first pin and the second pin are also respectively located on two sides of the base; and/or, the first sliding groove and the second sliding groove are respectively located above the first rotating shaft.

According to some embodiments of the present application, on a plane perpendicular to an axis extending direction of the first rotating shaft, a center of the first pin, a center of the second rotating shaft, and a center of the second pin are in a same straight line.

According to some embodiments of the present application, the second rotating shaft penetrates through the base and is fixed to the base.

According to some embodiments of the present application, in an axis extending direction of the first rotating shaft, the first connecting base, the base, and the second connecting base are arranged in sequence.

According to some embodiments of the present application, the second rotating shaft is fixedly provided on the base, an arc-shaped first limiting groove having a center of a circle defined by the axis of the first rotating shaft is provided on the first connecting base at a position corresponding to the second rotating shaft, and an arc-shaped second limiting groove having a center of a circle defined by the axis of the first rotating shaft is provided on the second connecting base at a position corresponding to the second rotating shaft. When the base rotates relative to the second connecting base, the second rotating shaft slides in the first limiting groove along a longitudinal direction of the first limiting groove, and the second rotating shaft always pushes against one end of the second limiting groove; when the base rotates relative to the first connecting base, the second rotating shaft slides in the second limiting groove along a longitudinal direction of the second limiting groove, and the second rotating shaft always pushes against one end of the first limiting groove.

Further, the first limiting groove and the second limiting groove are respectively located above the first rotating shaft.

According to some embodiments of the present application, the first rotating shaft is located under the second rotating shaft.

Another technical solution adopted by the present application: a stroller, including a stroller frame having a folded configuration and an unfolded configuration, a front wheel assembly arranged in front of the bottom of the stroller frame, and a rear wheel assembly arranged behind the bottom of the stroller frame, the stroller frame including a push rod, a front bracket with the front wheel assembly at the bottom, and a rear bracket with the rear wheel assembly at the bottom, the push rod, the front bracket and the rear bracket being connected by the rotating joint described above, wherein the base is provided at a lower part of the push rod, and the first connecting base is provided at an upper part of the front bracket, and the second connecting base is provided at an upper part of the rear bracket.

Further, the push rod has a forward use state and a reverse use state; the stroller frame has a first folded configuration after being folded from the forward use state of the push rod and a second folded configuration after being folded from the reverse use state of the push rod; when folding from the forward use state of the push rod, the push rod is driven to rotate closer to the rear bracket, and the base rotates relative to the second connecting base; the first linkage unit then coordinates with the first connecting base to rotate relative to the second connecting base, thereby the front bracket rotates closer to the rear bracket; and when the stroller frame is in the first folded configuration, the push rod and the rear bracket are located behind the front bracket in a front-rear direction; when folding from the reverse use state of the push rod, the push rod is driven to rotate closer to the front bracket, the second linkage unit coordinates with the second connecting base to rotate relative to the first connecting base, thereby the rear bracket to rotate closer to the front bracket; and when the stroller frame is in the second folded configuration, the push rod and the front bracket are located in front of the rear bracket in the front-back direction.

In some desired and specific embodiments, in a left-right direction of the stroller, the first connecting base, the base, and the second connecting base are arranged in sequence.

Yet another technical solution adopted by the present application: a child product, including a base rod, a first bracket rod and a second bracket rod, the base rod, the first bracket rod and the second bracket rod being connected by the rotating joint described above, wherein one of the base rod, the first bracket rod and the second bracket rod is provided with the base, one of the other two rods of the base rod, the first bracket rod and the second bracket rod is provided with the first connecting base, the other one of the other two rods of the base rod, the first bracket rod and the second bracket rod is provided with the second connecting base, and the rod with the base is located between the rod with the first connecting base and the rod with the second connecting base.

Further, the base rod is provided with the base, the first bracket rod is provided with the first connecting base, the second bracket rod is provided with the second connecting base, and the first bracket rod and the second bracket rod are respectively located on two opposite sides of the base rod.

In some specific embodiments, the child product is a stroller, a baby seat, a crib or a rocking chair.

With adoption of the above technical solutions, the present application has the following beneficial effects as compared with the conventional art.

When the base rotates relative to the second connecting base, the first linkage unit coordinates with the first connecting base to rotate relative to the second connecting base, and when the base rotates relative to the first connecting base, the second linkage unit coordinates with the second connecting base to rotate relative to the first connecting base. In this way, the rotating joint of the present application coordinates with both the first and second connecting bases to rotate, thereby simplifying operation steps. Moreover, the rotating joint is simple in joint structure, and can simplify the structure of a child product using the same so that the child product becomes more lightweight as a whole.

BRIEF DESCRIPTION

Some of the embodiments will be described in detail, with references to the following Figures, wherein like designations denote like members, wherein.

Figure 36:
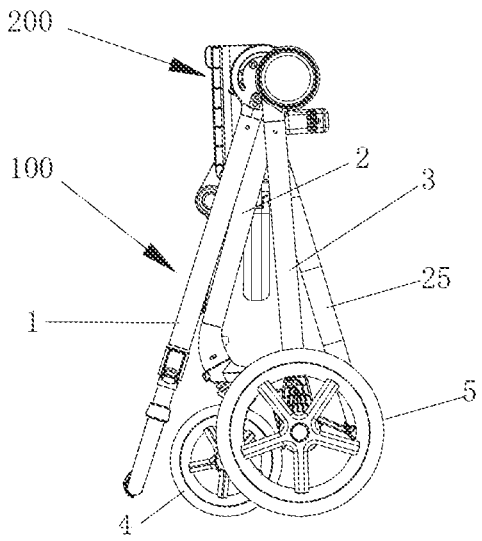
Figure 37:
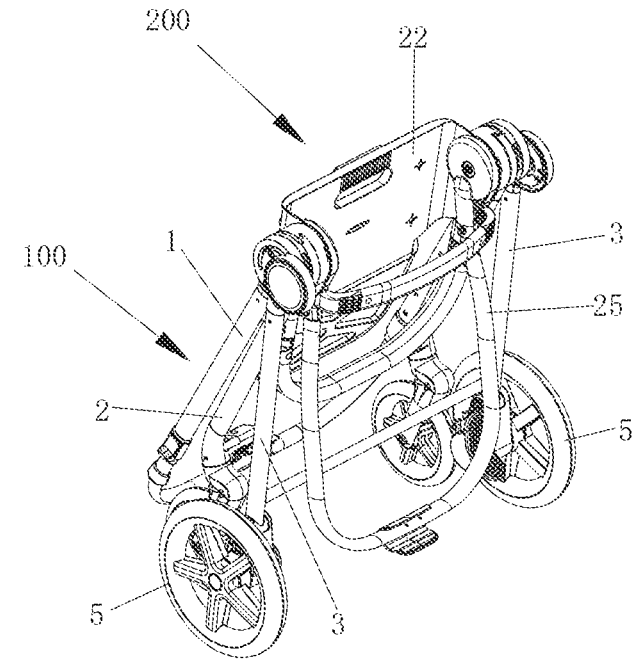

FIG. 36 is a schematic side view of the stroller equipped with the seat frame and in the second folded configuration according to an embodiment of the present application in a case where the push rod is in the reverse use state and the seat frame is installed reversely; and FIG. 37 is a schematic three-dimensional structural diagram of the stroller equipped with the seat frame and in the second folded configuration according to an embodiment of the present application in a case where the push rod is in the reverse use state and the seat frame is installed reversely;

In the figures: 100, stroller frame; 200, seat frame;

1, push rod; 2, front bracket; 3, rear bracket; 4, front wheel assembly; 5, rear wheel assembly; 6, first rotating shaft; 7, second rotating shaft; 8, first pin; 9, second pin; 10, first sliding groove; 11, second sliding groove; 12, first groove; 13, second groove; 14, first limiting groove; 15, second limiting groove; 16, base; 17, first connecting base; 18, second connecting base; 19, first cross rod; 20, second cross rod; 21, mounting part; 22, seat plate; 23, support plate; 24, armrest rod; 25, backrest rod; 26, support rod; 27, slider; 28, lock pin; 29, first lock slot; 30, second lock slot; 31, unlocking button; P, first intersection; Q, second intersection; M, first end; N, second end.

DETAILED DESCRIPTION

Figure 1:
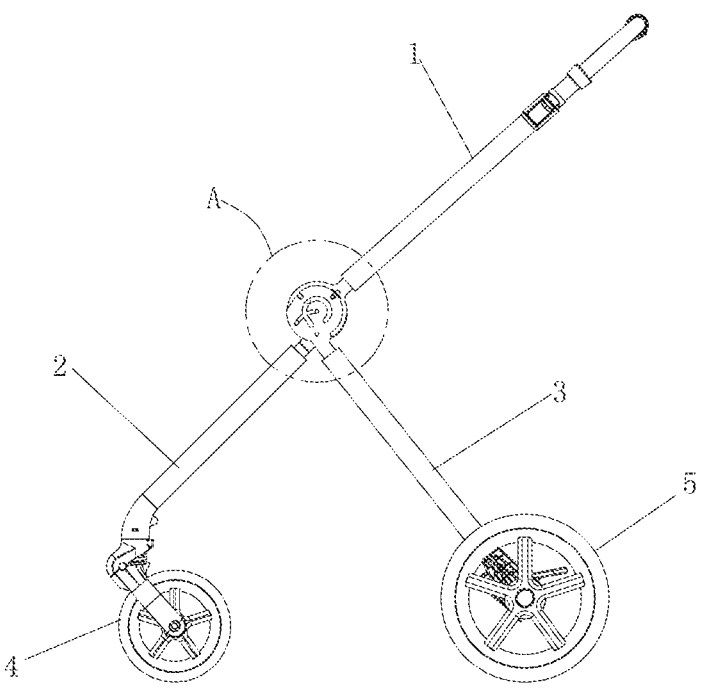
FIG. 1 is a schematic side view of a stroller in an unfolded configuration according to an embodiment of the present application in a case where a push rod is in a forward use state.

Embodiments of the present invention will be further described below in conjunction with the accompanying drawings:

In the description of the present application, it should be noted that the orientation or positional relationship indicated by the terms "center", "upper", "lower", "left", "right", "vertical", "horizontal", "inner", "outer", "left-right direction", "height direction", "up-down direction", "front-back direction", etc., is based on the orientation or positional relationship shown in FIG. 1 of the stroller having a baby sitting inside. They are used only for the convenience of describing the present application and simplifying the description, rather than indicating or implying that the indicated device or element must have a specific orientation, or only has a specific orientation or must be constructed and operated in a specific orientation, so they should not be construed as limiting the present application. In addition, the terms "first", "second", "third" and the like are used herein for descriptive purposes only, and should not be construed as indicating or implying relative importance.

The child product, as shown in FIGS. 1-21, includes a base rod, a first bracket rod and a second bracket rod that are rotatably connected to each other. The base rod, the first bracket rod and the second bracket rod are connected by a rotating joint. The rotating joint includes a base 16, a first connecting base 17 and a second connecting base 18. The base 16 may be provided on the base rod, the first connecting base 17 is provided on one of the first bracket rod and the second bracket rod, and the second connecting base 18 is provided on the other one of the first bracket rod and the second bracket rod. Alternatively, the base 16 may also be provided on the first bracket rod, the first connecting base 17 is provided on one of the base rod and the second bracket rod, the second connecting base 18 is provided on the other one of the base rod and the second bracket rod. The base 16 may also be provided on the second bracket rod, the first connecting base 17 is provided on one of the base rod and the first bracket rod, the second connecting base 18 is provided on the other one of the base rod and the first bracket rod. No matter how the base 16, the first connecting base 17, and the second connecting base 18 are arranged, it must be satisfied that the rod with the base 16 is located between the other two rods.

In this embodiment, the child product is described by example of a stroller. Specifically, the stroller, as shown in FIGS. 1-21, includes a stroller frame 100 having a folded configuration and an unfolded configuration, a front wheel assembly 4 arranged in front of the bottom of the stroller frame 100, a rear wheel assembly 5 arranged behind the bottom of the stroller frame 100, and a locking mechanism configured to lock the stroller frame 100 in the unfolded configuration. The stroller frame 100 includes symmetrically arranged side brackets. The side bracket on each side includes a push rod 1, a front bracket 2 with the front wheel assembly 4 at the bottom, and a rear bracket 3 with the rear wheel assembly 5 at the bottom. On each side, one of the push rod 1, the front bracket 2 and the rear bracket 3 is provided with the base 16, one of the other two rods is provided with the first connecting base 17, the other of the other two rods is provided with the second connecting base 18, and the rod with the base 16 is located between the rod with the first connecting base 17 and the rod with the second connecting base 18.

In this embodiment, the push rod 1 is provided with the base 16, the front bracket 2 is provided with the first connecting base 17, the rear bracket 3 is provided with the second connecting base 18. That is, the push rod 1 constitutes the base rod, the front bracket 2 constitutes the first bracket rod, the rear bracket 2 constitutes the second bracket rod. The base rod, the first bracket rod and the second bracket rod are connected by a rotating joint. That is, the push rod 1, the front bracket 2, and the rear bracket 3 are connected by a rotating joint.

Figure 10:
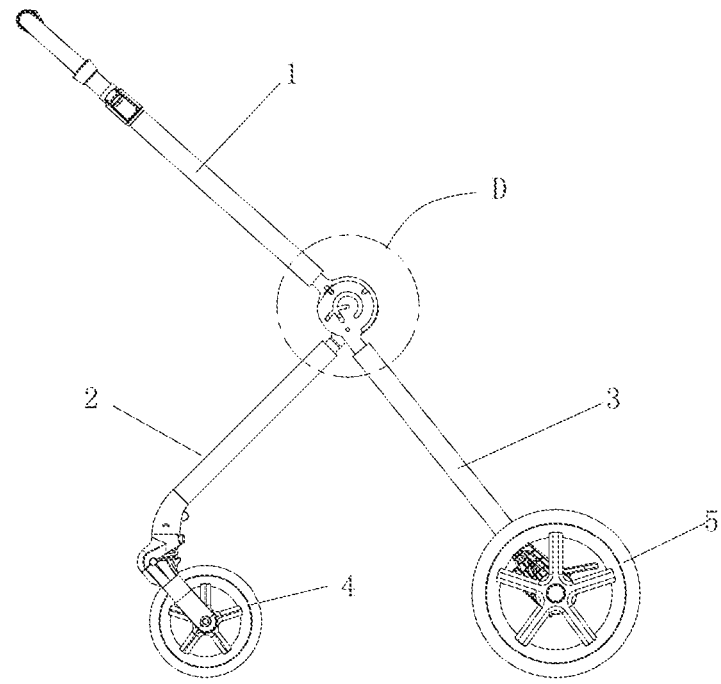
FIG. 10 is a schematic side view of a stroller in an unfolded configuration according to an embodiment of the present application in a case where a push rod is in a reverse use state.
Figure 11:
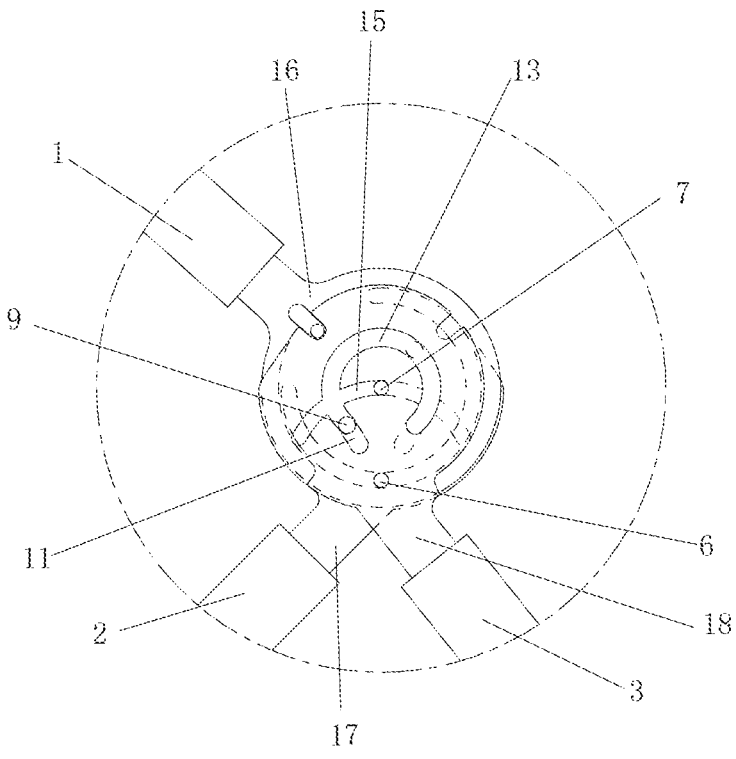
FIG. 11 is an enlarged schematic diagram of part D in FIG. 10.
Figure 12:
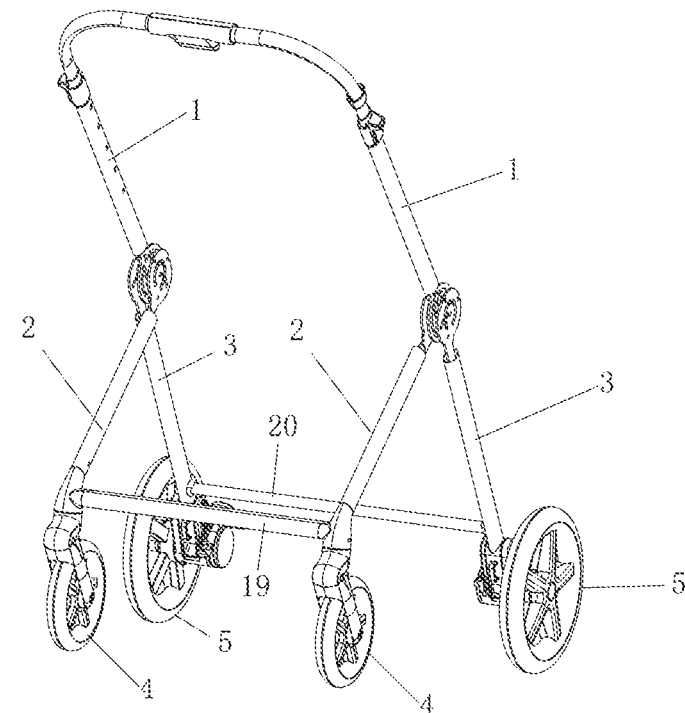
FIG. 12 is a schematic three-dimensional structural diagram of the stroller in the unfolded configuration according to an embodiment of the present application in a case where the push rod is in the reverse use state.

The rotating joint includes a base 16, a first connecting base 17 and a second connecting base 18 that are rotatably connected to each other. The base 16 is fixedly provided at a lower end of the push rod 1, the first connecting base 17 is fixedly provided at an upper end of the front bracket 2, and the second connecting base 18 is fixedly provided at an upper end of the rear bracket 3. The first connecting base 17 and the second connecting base 18 are rotatably connected by the first rotating shaft 6. The first connecting base 17 and the second connecting base 18 are also rotatably connected to the base 16 by the second rotating shaft 7. The axis of the first rotating shaft 6 and the axis of the second rotating shaft 7 are arranged in parallel. A first linkage unit is provided between the first connecting base 17 and the base 16, and a second linkage unit is provided between the second connecting base 18 and the base 16. When the base 16 rotates, relative to the second connecting base 18, around the second rotating shaft 7 in a first direction, the first linkage unit coordinates with the first connecting base 17 to rotate, relative to the second connecting base 18, around the first rotating shaft 6 (drive) in a second direction opposite to the first direction. That is, when the push rod 1 rotates around the second rotating shaft 7 relative to the rear bracket 3, the first linkage unit coordinates with the front bracket 2 to rotate around the first rotating shaft 6 (drive) relative to the rear bracket 3. As shown in FIG. 1, the first direction is clockwise direction and the second direction is counterclockwise direction. As shown in FIG. 10, when the base 16 rotates, relative to the first connecting base 17, around the second rotating shaft 7 in the second direction, the second linkage unit coordinates with the second connecting base 18 to rotate, relative to the first connecting base 17, around the first rotating shaft 6 (drive) in the first direction. That is, the second linkage unit makes the rear bracket 2 rotate (drive) relative to the front bracket 2 when the push rod 1 rotates relative to the front bracket 2.

The first linkage unit includes a first pin 8 provided on the base 16 and a first sliding groove 10 formed in the first connecting base 17, the first pin 8 is slidably and rotatably inserted in the first sliding groove 10, and the axis of the first pin 8 is arranged parallel to the axis of the first rotating shaft 6 or the axis of the second rotating shaft 7. The second linkage unit includes a second pin 9 provided on the base 16 and a second sliding groove 11 formed in the second connecting base 18, the second pin 9 is slidably and rotatably inserted in the second sliding groove 11, and the axis of the second pin 9 is arranged parallel to the axis of the first rotating shaft 6 or the axis of the second rotating shaft 7. In the left-right direction of the stroller, the first connecting base 17, the base 16, and the second connecting base18 are arranged in sequence, so that the rotations of the first connecting base 17 and the second connecting base 18 do not interfere with each other.

Figure 21:
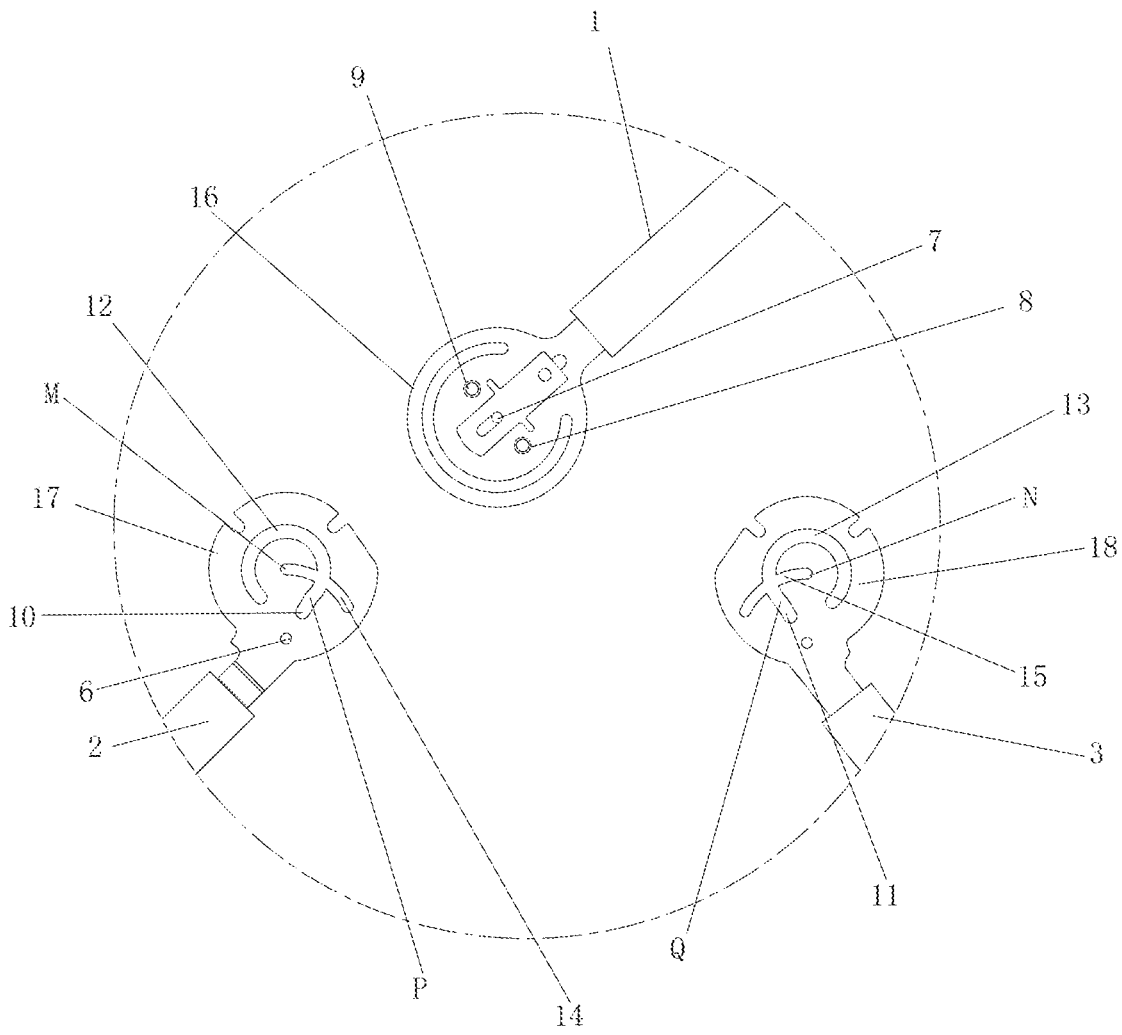
FIG. 21 is an enlarged schematic diagram of part G in FIG. 20.

Referring to FIG. 21, the first pin 8 is fixedly provided on the base 16, the first sliding groove 10 is formed in the first connecting base 17, a first groove 12 is formed in the first connecting base 17 at the position corresponding to the first pin 8 and along the rotationally extending direction of the first pin 8, the first groove 12 is configured to yield the first pin 8, an end of the first groove 12 is connected with an end of the first sliding groove 10, and the conjunction between the first groove 12 and the first sliding groove 10 is denoted first intersection P; the second pin 9 is fixedly provided on the base 16, the second sliding groove 11 is formed in the second connecting base 18, a second groove 13 is formed in the second connecting base 18 at the position corresponding to the second pin 9 and along the rotationally extending direction of the second pin 9, an end of the second groove 13 is connected with an end of the second sliding groove 11, and the conjunction between the second groove 13 and the second sliding groove 11 is denoted second intersection Q. When the push rod 1 rotates relative to the rear bracket 3, the first pin 8 relatively slides and rotates in the first sliding groove 10, the front bracket 2 is then driven to rotate relative to the rear bracket 3, and the second pin 9 slides in the second groove 13 along the longitudinal direction of the second groove 13. When the push rod 1 rotates relative to the front bracket 2, the second pin 9 relatively slides and rotates in the second sliding groove 11, the rear bracket 3 is then driven to rotate relative to the front bracket 2, and the first pin 8 slides in the first groove 12 along the longitudinal direction of the first groove 12.

In the axis extending direction of the first rotating shaft 6, the first connecting base 17, the base 16, and the second connecting base 18 are arranged in sequence. The second rotating shaft 7 penetrates through the base 16 and is fixed to the base 16. In the axis extending direction of the first rotating shaft 6, the first pin 8 is located on one side of the base 16, and the second pin 9 is located on the second side of the base 16; the first pin 8 and the second pin 9 are also respectively located on two sides of the second rotating shaft 7; the first sliding groove 10, the second sliding groove 11, the first groove 12, and the second groove 13 are respectively located above the first rotating shaft 6. The first rotating shaft 6 is located under the second rotating shaft 7.

An arc-shaped first limiting groove 14 having the center of the circle defined by the axis of the first rotating shaft 6 is formed in the first connecting base 17 at the position corresponding to the second rotating shaft 7. The first limiting groove 14 intersects the first groove 12 at an intersection which is located above the first intersection P. The first limiting groove 14 has a first end M, and the first groove 12 is an arc-shaped groove formed with the center of the first end M as the center of the circle. An arc-shaped second limiting groove 15 having the center of the circle defined by the axis of the first rotating shaft 6 is provide on the second connecting base 18 at the position corresponding to the second rotating shaft 7. The second limiting groove 15 intersects the second groove 13 at an intersection which is located above the second intersection Q. The second limiting groove 15 has a second end N, and the second groove 13 is an arc-shaped groove formed with the center of the second end N as the center of the circle.

When the push rod 1 rotates relative to the rear bracket 3, the second rotating shaft 7 slides in the first limiting groove 14 along the longitudinal direction of the first limiting groove 14, and the second rotating shaft 7 always pushes against one end of the second limiting groove 15, that is, the second rotating shaft 7 always pushes against the second end N of the second limiting groove 15. When the push rod 1 rotates relative to the front bracket 2, the second rotating shaft 7 slides in the second limiting groove 15 along the longitudinal direction of the second limiting groove 15, and the second rotating shaft 7 always pushes against one end of the first limiting groove 14, that is, the second rotating shaft 7 always pushes against the first end M of the first limiting groove 14.

Figure 19:
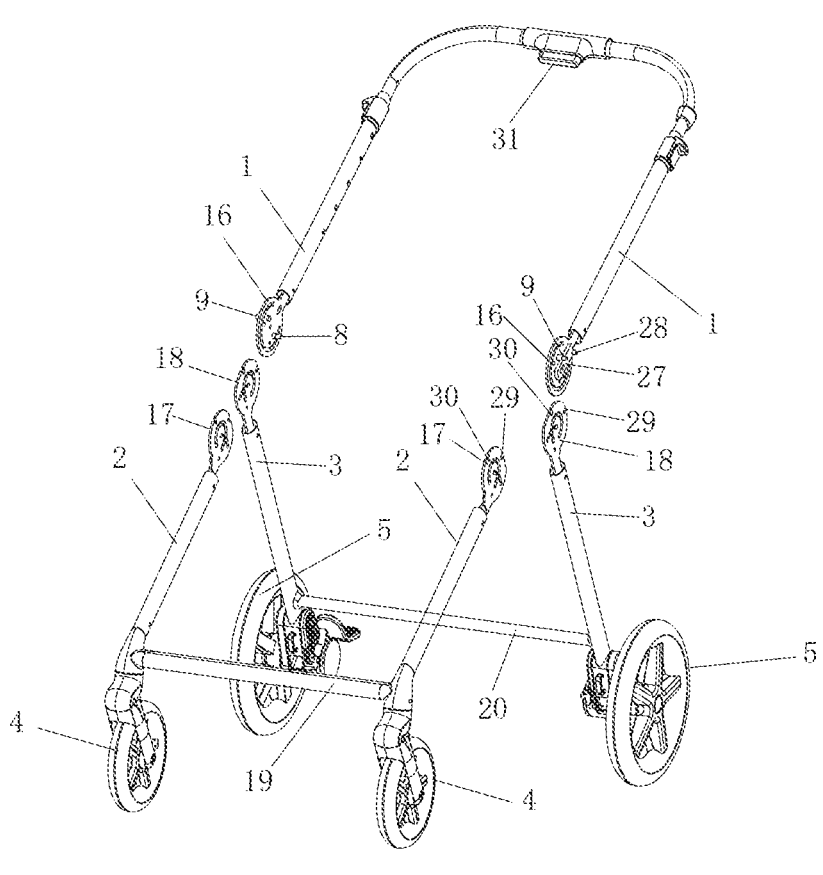
FIG. 19 is a schematic exploded three-dimensional structural diagram of the stroller according to an embodiment of the present application.
Figure 20:
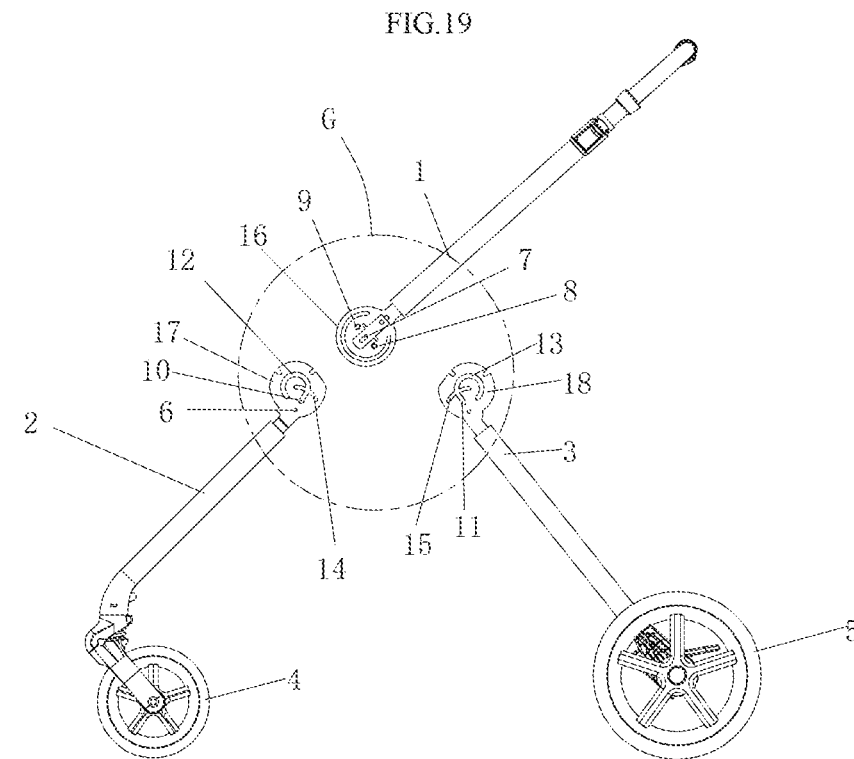
FIG. 20 is a schematic exploded side view of the stroller according to an embodiment of the present application.

In this embodiment, the locking mechanism configured to lock the stroller frame in the unfolded configuration is not a design point of the present application. It can be implemented by the conventional art, which will not be limited herein. In this embodiment, as shown in FIG. 19, the locking mechanism includes a slider 27 slidably arranged on the base 16, a lock pin 28 fixedly arranged at one end of the slider 27, and a first lock slot 29 and a second lock slot 30 that are sequentially formed in the second connecting base 18 along the circumferential direction of the second connecting base 18. The lock pin 28 works together with the first lock slot 29 or the second lock slot 30 to lock the stroller in the unfolded configuration. The slider 27 is provided between the base 16 and the second connecting base 18. When the lock pin 28 is inserted into the first lock slot 29, the locking mechanism locks the stroller in the forward use and unfolded configuration, as shown in FIG. 1. When the lock pin 28 is inserted into the second lock slot 30, the locking mechanism locks the stroller in the reverse use and unfolded configuration, as shown in FIG. 10. The locking mechanism further includes an unlocking button 31 provided on the push rod 1. By pressing the unlocking button 31, the lock pin 28 can be separated from the first lock slot 29 or the second lock slot 30. Specifically, for example, a traction cable is provided between the unlocking button 31 and the slider 27 or the lock pin 28, an elastic member is provided between the slider 27 or the lock pin 28 and the base 16 for causing the lock pin 28 to tend to be inserted into the first lock slot 29 or the second lock slot 30.

In order to lock the stroller frame 100 in the unfolded configuration more stably, the slider 27 and the locking pin 28 (not shown) may also be symmetrically provided between the base 16 and the first connecting base 17, and the first lock slot 29 and the second lock slot 30 are sequentially formed in the first connecting base 17 along the circumferential direction of the first connecting base 17.

Figure 2:
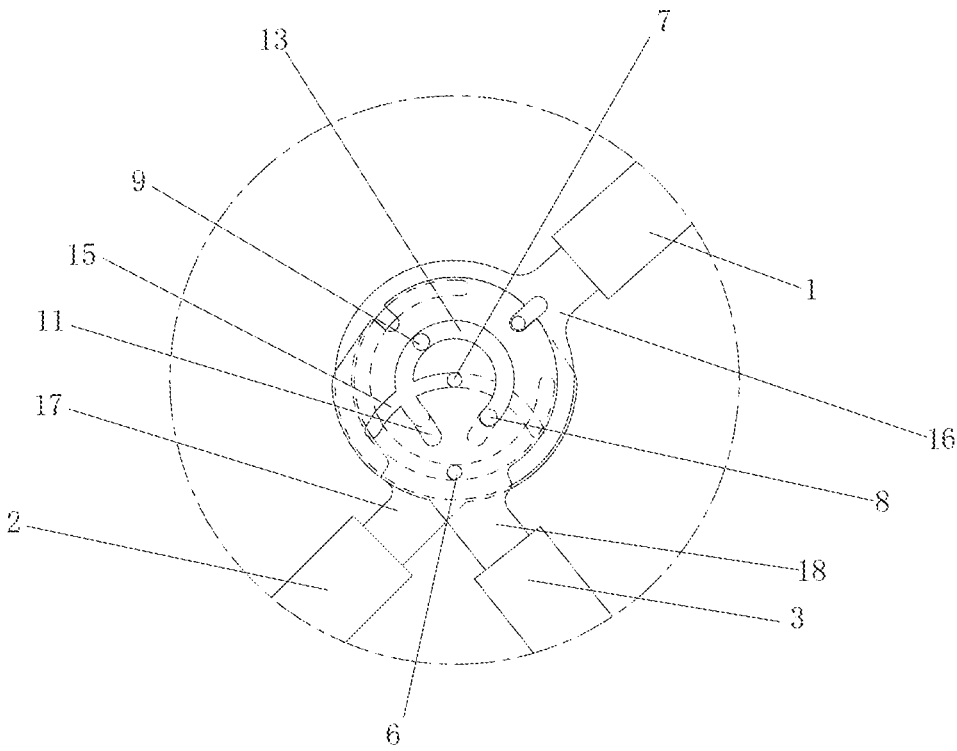
FIG. 2 is an enlarged schematic diagram of part A in FIG. 1.
Figure 3:
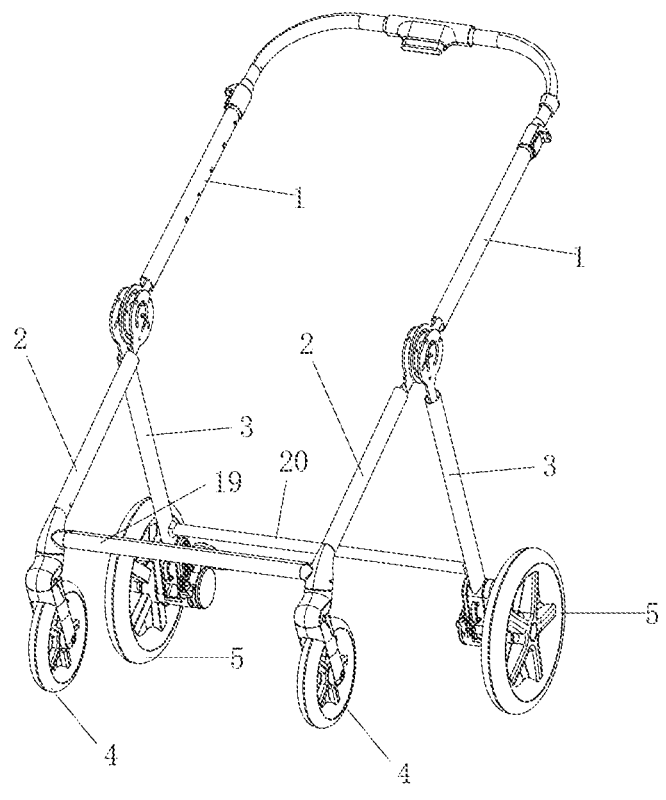
FIG. 3 is a schematic three-dimensional structural diagram of the stroller in the unfolded configuration according to an embodiment of the present application in a case where the push rod is in the forward use state.

How the stroller works:

Referring to FIGS. 1-3, the stroller is in the unfolded configuration and the push rod 1 is in the forward use state, the push rod 1, the front bracket 2 and the rear bracket 3 are relatively unfolded, the push rod 1 extends obliquely from bottom to top along the front-rear direction of the stroller, the second rotating shaft 7 is respectively located at the first end M of the first limiting groove 14 and the second end N of the second limiting groove 15 and the tree push against each other. The first pin 8 is located at the intersection of the first sliding groove 10 and the first groove 12, that is, the first pin 8 is located at the first intersection P; the second pin 9 is located in the second groove 13; the first groove 12 and the second groove 13 at least partially coincide; the center of the base 16, the center of the first connecting base 17, and the center of the second connecting base18 roughly coincide, as shown in FIGS. 1-2 and 22-23.

Figure 4:
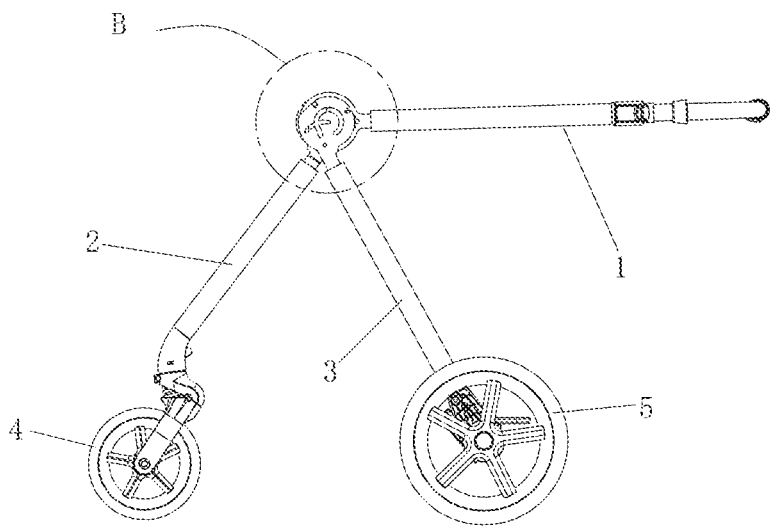
FIG. 4 is a schematic side view of the stroller in a semi-folded configuration according to an embodiment of the present application in a case where the push rod is in the forward use state.
Figure 5:
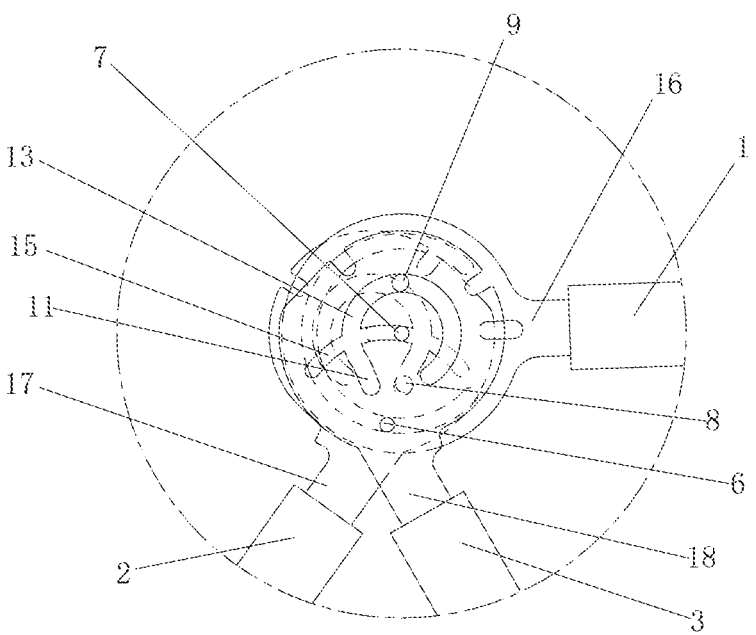
FIG. 5 is an enlarged schematic diagram of part B in FIG. 4.
Figure 6:
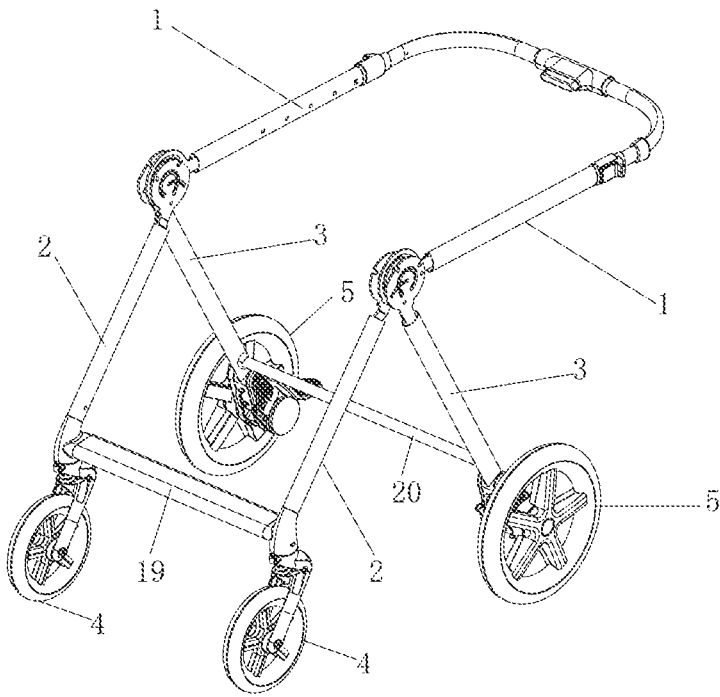
FIG. 6 is a schematic three-dimensional structural diagram of the stroller in the semi-folded configuration according to an embodiment of the present application in a case where the push rod is in the forward use state.
Figure 7:
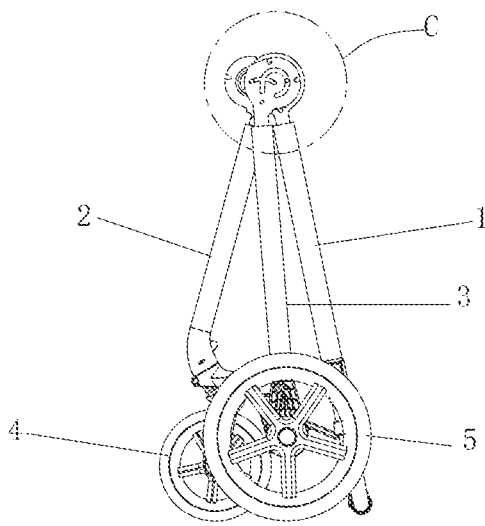
FIG. 7 is a schematic side view of the stroller in a first folded configuration according to an embodiment of the present application.
Figure 8:
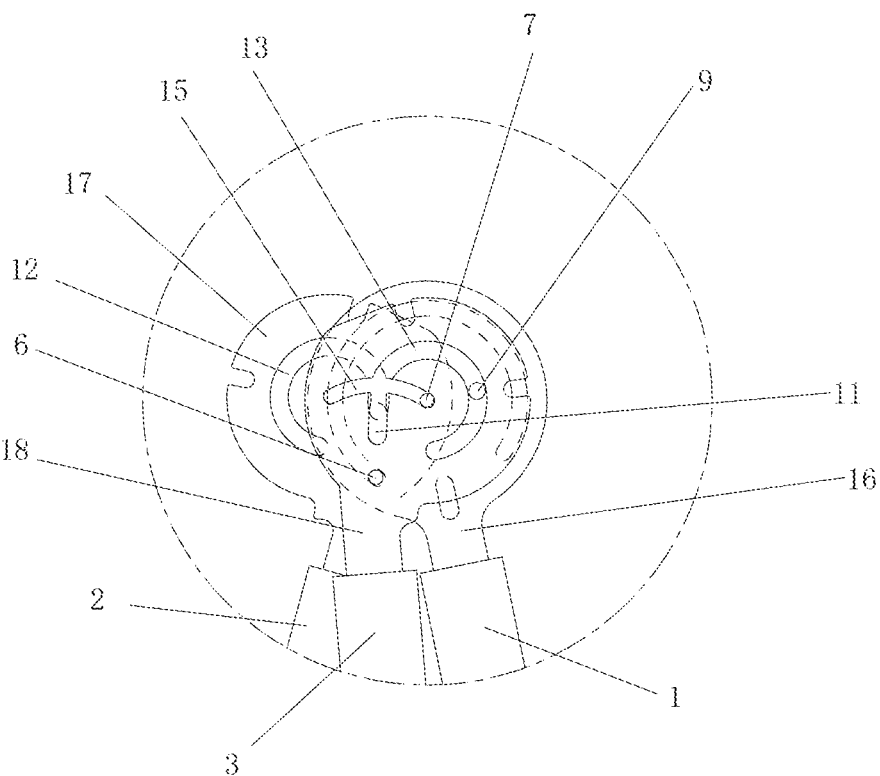
FIG. 8 is an enlarged schematic diagram of part C in FIG. 7.
Figure 9:
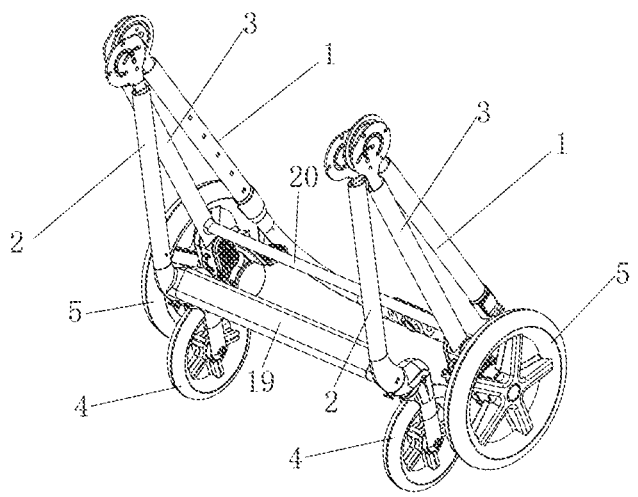
FIG. 9 is a schematic three-dimensional structural diagram of the stroller in the first folded configuration according to an embodiment of the present application.

To fold the stroller up, you need to unlock the locking mechanism and press down the push rod 1 to drive the push rod 1 to rotate around the second rotating shaft 7 and move closer to the rear bracket 3, as shown in FIGS. 4-6. During the rotation process, the second rotating shaft 7 slides in the first limiting groove 14 along the longitudinal direction of the first limiting groove 14 and the second rotating shaft 7 always pushes against the second end N of the second limiting groove 15; the first pin 8 slides downward into the first sliding groove 10 from the first intersection P, and at the same time pushes against the side wall of the first sliding groove 10 and rotates relatively, thereby driving the first connecting base 17 to rotate around the first rotating shaft 6 relative to the second connecting base 18, that is, the front bracket 2 rotates around the first rotating shaft 6 toward the rear bracket 3, and the second pin 9 slides in the second groove 13 along the longitudinal direction of the second groove 13, that is, when the push rod 1 rotates closer to the rear bracket 3, the front bracket 2 is driven to rotate closer to the rear bracket 3 in a linked mode, thus completing the folding operation finally. After the folding operation is completed, referring to FIGS. 7-9, the stroller is in the first folded configuration, the push rod 1 and the rear bracket 3 are located behind the front bracket 2 in the front-rear direction, and the push rod 1 is located behind the rear bracket 3. The center of the base 16 and the center of the second connecting base 18 roughly coincide, and the center of the first connecting base 17 is staggered from the center of the base 16 and the center of the second connecting base 18, as shown in FIGS. 7-8 and 24-25. To unfold the stroller, the above operation only needs to be implemented in a reverse way. That is, you only need to rotate the push rod 1 upward relative to the rear bracket 3 to unfold. The front bracket 2 is then driven to rotate relative to the rear bracket 3 in a linked mode until the stroller is completely unfolded, and then the locking mechanism is locked, thus completing the unfolding operation. The operation is very simple.

When the stroller is in the unfolded configuration and the push rod 1 needs to be reversed, for example, when the push rod 1 needs to be changed from the forward use state to the reverse use state, you only need to unlock the locking mechanism and rotate the push rod 1 around the second rotating shaft 7 to move closer to the front bracket 2 of the stroller. During the rotation process, the second rotating shaft 7 is always located at the first end M of the first limiting groove 14 and the second end N of the second limiting groove 15 and the three push against each other. The first pin 8 rotates into the first groove 12, and the second pin 9 rotates in the second groove 13 to the intersection of the second groove 13 and the second sliding groove 11, that is, the second pin 9 rotates to the location of the second intersection Q, and then the locking mechanism is locked, thus completing the reversing operation of the push rod. In this state, the first groove 12 and the second groove 13 still partially coincide, and the center of the base 16, the center of the first connecting base 17, and the center of the second connecting base18 roughly coincide, as shown in FIGS. 10-12 and 34-35.

Figure 13:
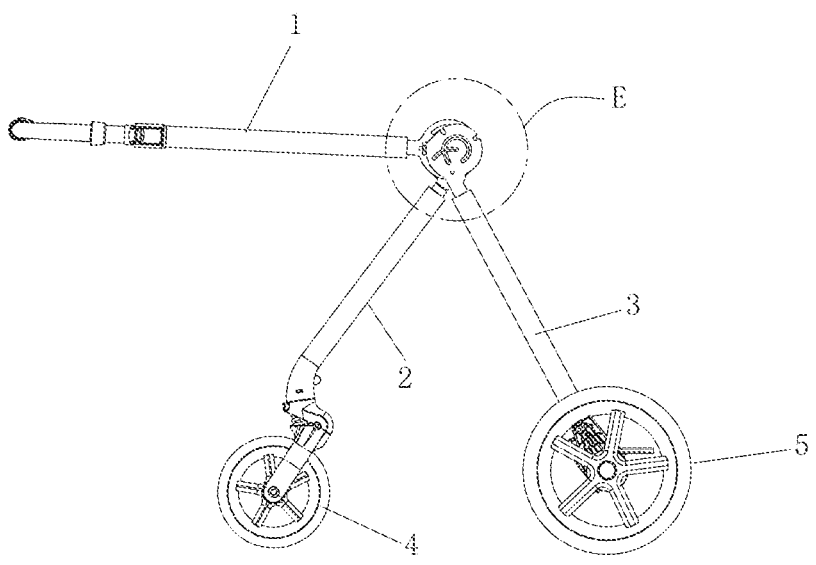
FIG. 13 is a schematic side view of the stroller in a semi-folded configuration according to an embodiment of the present application in a case where the push rod is in the reverse use state.
Figure 14:
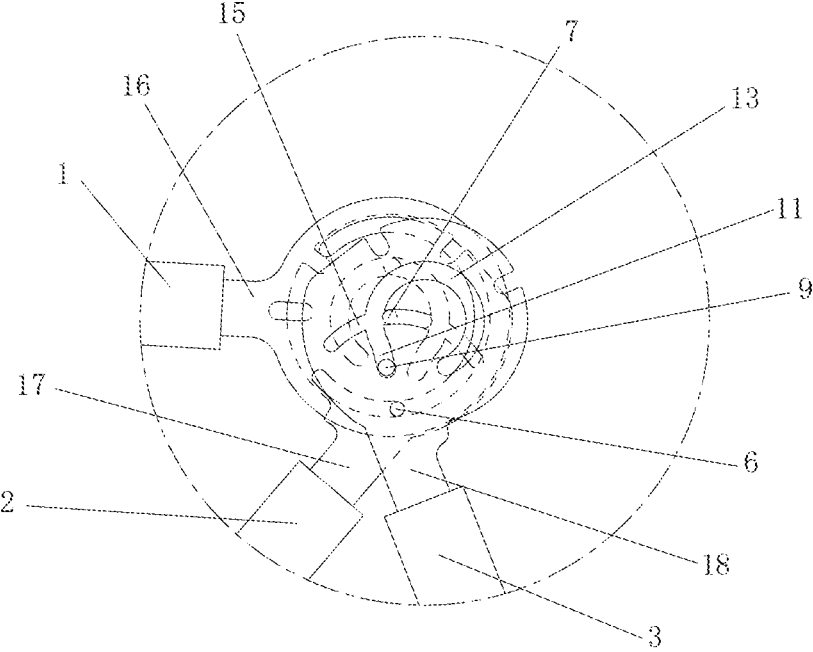
FIG. 14 is an enlarged schematic diagram of part E in FIG. 13.
Figure 15:
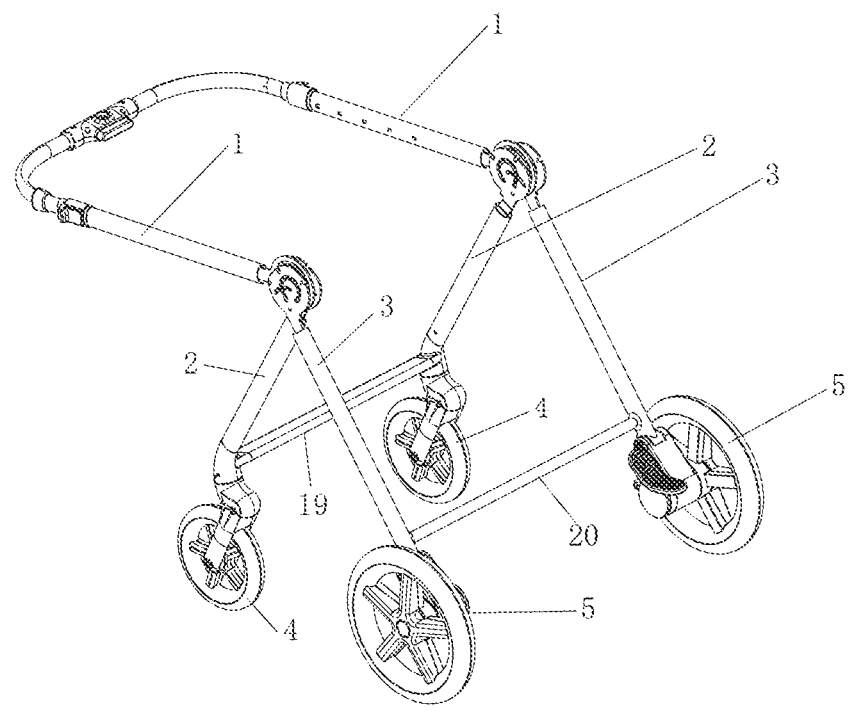
FIG. 15 is a schematic three-dimensional structural diagram of the stroller in the semi-folded configuration according to an embodiment of the present application in a case where the push rod is in the reverse use state.
Figure 16:
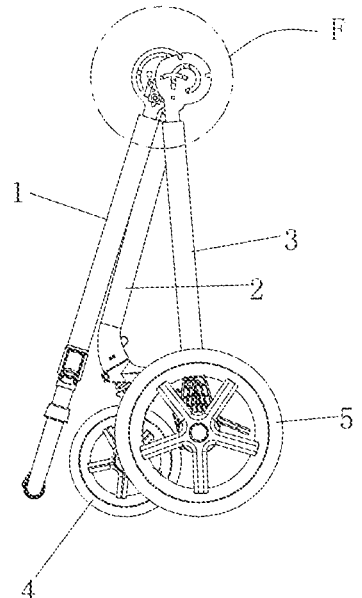
FIG. 16 is a schematic side view of the stroller in a second folded configuration according to an embodiment of the present application in a case where the push rod is in the reverse use state.
Figure 17:
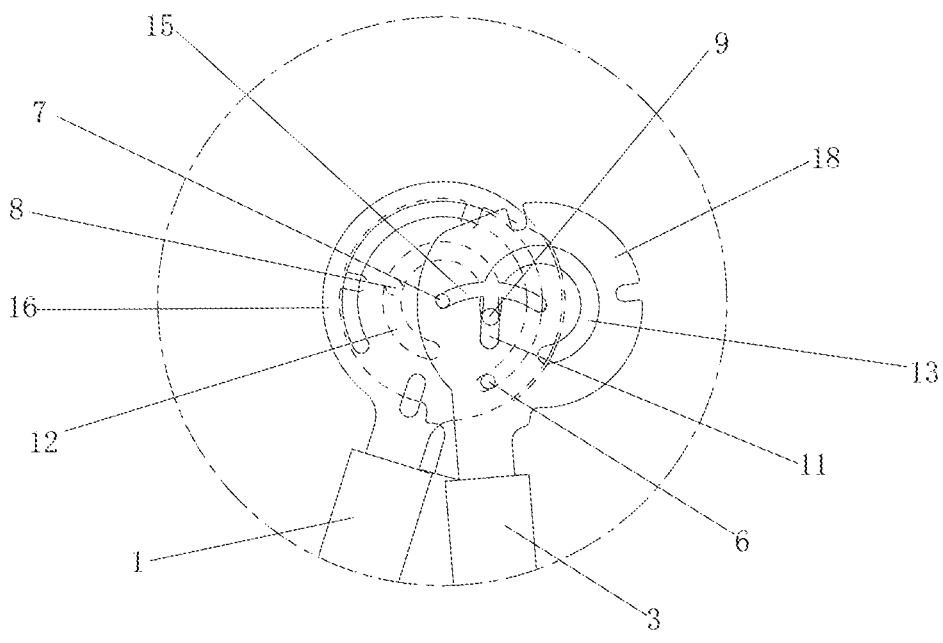
FIG. 17 is an enlarged schematic diagram of part F in FIG. 16.
Figure 18:
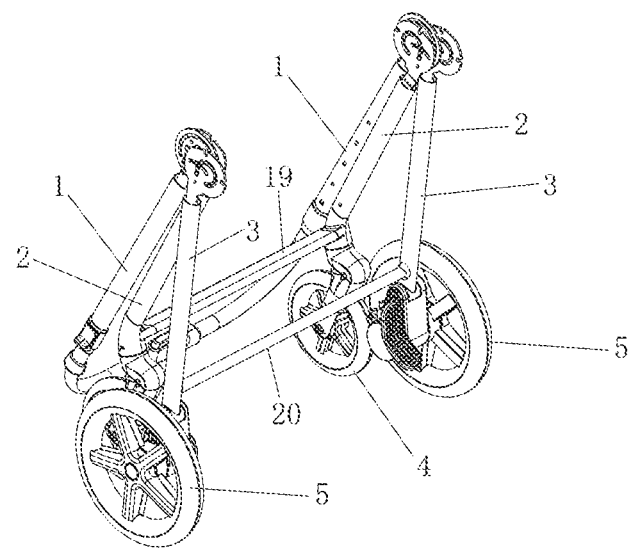
FIG. 18 is a schematic three-dimensional structural diagram of the stroller in the second folded configuration according to an embodiment of the present application in a case where the push rod is in the reverse use state.

To fold the stroller up in a case where the push rod 1 is in the reverse use state, the locking mechanism is unlocked, the push rod 1 is pressed down and the push rod 1 is driven to rotate around the second rotating shaft 7 and move closer to the front bracket 2, as shown in FIGS. 13-15. During the rotation process, the second rotating shaft 7 slides in the second limiting groove 15 along the longitudinal direction of the second limiting groove 15 and the second rotating shaft 7 always pushes against the first end M of the first limiting groove 14; the second pin 9 slides downward into the second sliding groove 11 from the second intersection Q, and at the same time pushes against the side wall of the second sliding groove 11 and rotates relatively, thereby driving the second connecting base 18 to rotate around the first rotating shaft 6 relative to the first connecting base 17, that is, the rear bracket 3 rotates closer to the front bracket 2 around the first rotating shaft 6, and the first pin 8 slides in the first groove 12 along the longitudinal direction of the first groove 12, that is, when the push rod 1 rotates closer to the front bracket 2, the rear bracket 3 is driven to rotate closer to the front bracket 2 in a linked mode, thus completing the folding operation finally. After the folding operation is completed, referring to FIGS. 16-18, the stroller is in the second folded configuration, the push rod 1 and the front bracket 2 are located in front of the rear bracket 3 in the front-rear direction, and the push rod 1 is located in front of the front bracket 2. The center of the base 16 and the center of the first connecting base 17 roughly coincide, and the center of the second connecting base 18 is staggered from the center of the base 16 and the center of the first connecting base 17, as shown in FIGS. 16-17 and 36-37. To unfold the stroller, the above operation only needs to be implemented in a reverse way. That is, only the push rod 1 needs to be rotated upward relative to the front bracket 2 to unfold. The rear bracket 3 is driven to rotate relative to the front bracket 2 in a linked mode to unfold until the stroller is completely unfolded, and then the locking mechanism is locked, thus completing the unfolding operation. The operation is very simple.

Referring to FIGS. 22-37, a seat frame 200 can also be installed on the stroller. The seat frame 200 can be folded and unfolded. The seat frame 200 can also be installed forward and reversely. Regardless of whether the seat frame 200 is installed forward or reversely, the push rod 1 can be reversed and the stroller can be folded. The folding operation of the stroller will not be interfered by the seat frame 200.

In this embodiment, the seat frame 200 is inserted between the front brackets 2 on both sides. The stroller frame 100 further includes a first cross rod 19 with two ends connected to the lower parts of the front brackets 2 on both sides and a second cross rod 20 with both ends connected to the lower parts of the rear brackets 3 on both sides. The first cross rod 19 and the second cross rod 20 are both rigid cross rods.

In this embodiment, the seat frame 200 includes mounting parts 21 to be mounted on the side bracket on each side, a seat plate 22 with two ends connected to the mounting parts 21 on both sides a support plate 23 with one end connected to one side of the seat plate 22, an armrest rod 24 with two ends connected to the mounting parts 21 on both sides, a backrest rod 25 with two ends connected to the mounting parts 21 on both sides, and the support rod 26 with two ends connected to the backrest rod 25. The armrest rod 24, the backrest rod 25, and the support rod 26 are all U-shaped rods.

Figure 22:
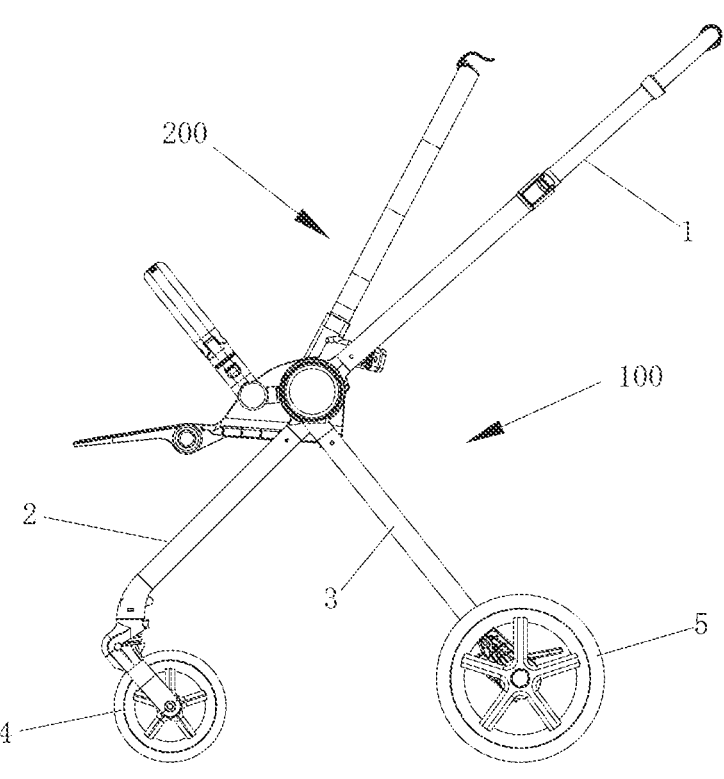
FIG. 22 is a schematic side view of a stroller equipped with a seat frame and in the unfolded configuration according to an embodiment of the present application in a case where the push rod is in the forward use state and the seat frame is installed forward.
Figure 23:
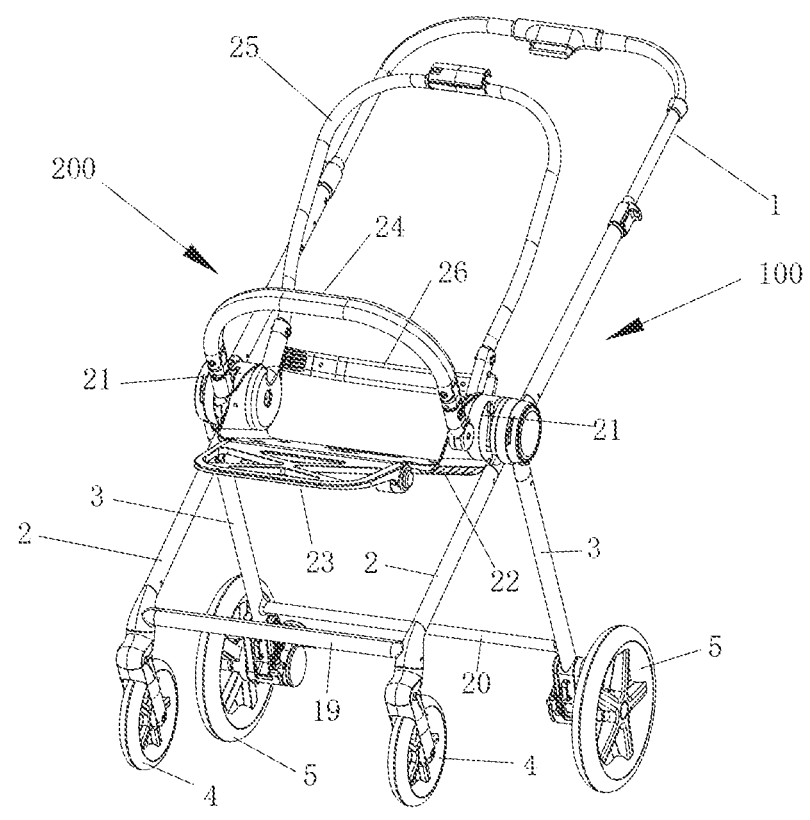
FIG. 23 is a schematic three-dimensional structural diagram of the stroller equipped with a seat frame and in the unfolded configuration according to an embodiment of the present application in a case where the push rod is in the forward use state and the seat frame is installed forward.

Specifically, for example, referring to FIGS. 22-23, the push rod 1 is in the forward use state and the seat frame 200 is installed forward. As shown in FIG. 22, the armrest rod 24 is located in front of the backrest rod 25, the support plate 23 is located in front of the seat plate 22, the backrest rod 25 extends from bottom to top along the front-rear direction of the stroller, and the support rod 26 is connected to the lower part of the backrest rod 25.

Figure 24:
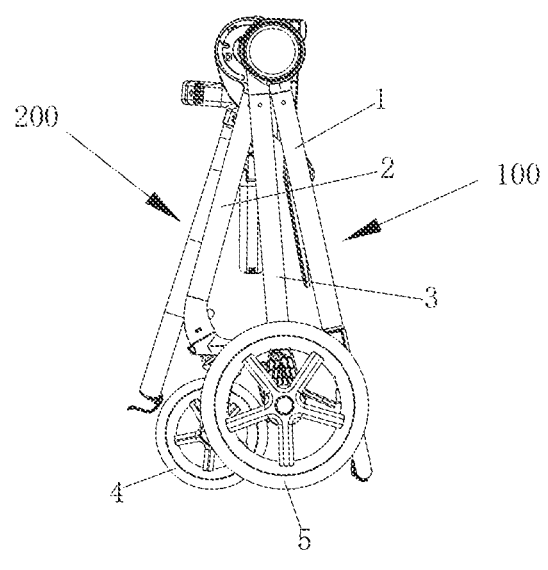
FIG. 24 is a schematic side view of the stroller equipped with the seat frame and in the first folded configuration according to an embodiment of the present application in a case where the push rod is in the forward use state and the seat frame is installed forward.
Figure 25:
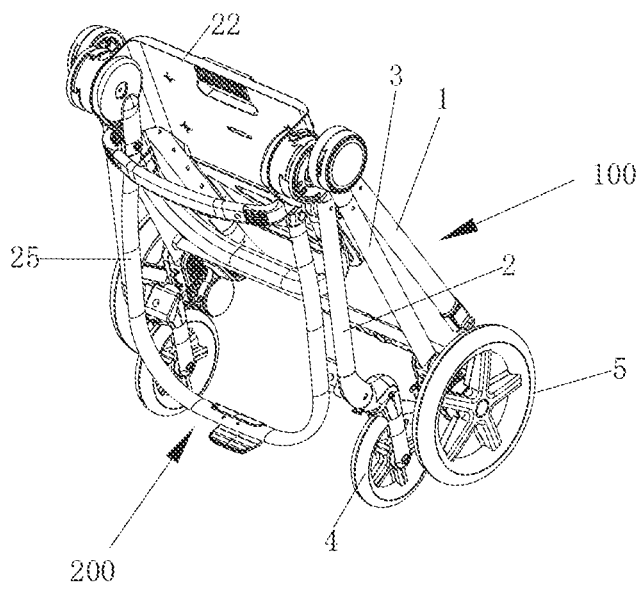
FIG. 25 is a schematic three-dimensional structural diagram of the stroller equipped with the seat frame and in the first folded configuration according to an embodiment of the present application in a case where the push rod is in the forward use state and the seat frame is installed forward.

To fold the stroller up, you need to unlock the stroller frame 100 and press down the push rod 1 to drive the push rod 1 to rotate closer to the rear bracket 3, and the front bracket 2 is linked to rotate closer to the rear bracket 3, thus completing the folding operation of the stroller frame 100 finally. In the meanwhile, the backrest rod 25 of the seat frame 200 is folded toward the front bracket 2 to fold the seat frame 200 up, the seat plate 22 is moved closer to the push rod 1, the armrest rod 24 is moved closer to the seat plate 22, and the backrest rod 25 is moved closer to the armrest rod 24. The folded stroller is shown in FIGS. 24-25, in which the push rod 1, the front bracket 2 and the rear bracket 3 are close to each other, and the front bracket 2, the rear bracket 3 and the push rod 1 are arranged in sequence; the backrest rod 25, the armrest rod 24 and the seat plate 22 are close to each other, and the backrest rod 25, the armrest rod 24 and the seat plate 22 are arranged in sequence. After folding up, the seat frame 200 and the stroller frame 100 are close to each other, and the backrest rod 25 is arranged close to the front bracket 2 and away from the push rod 1.

Figure 26:
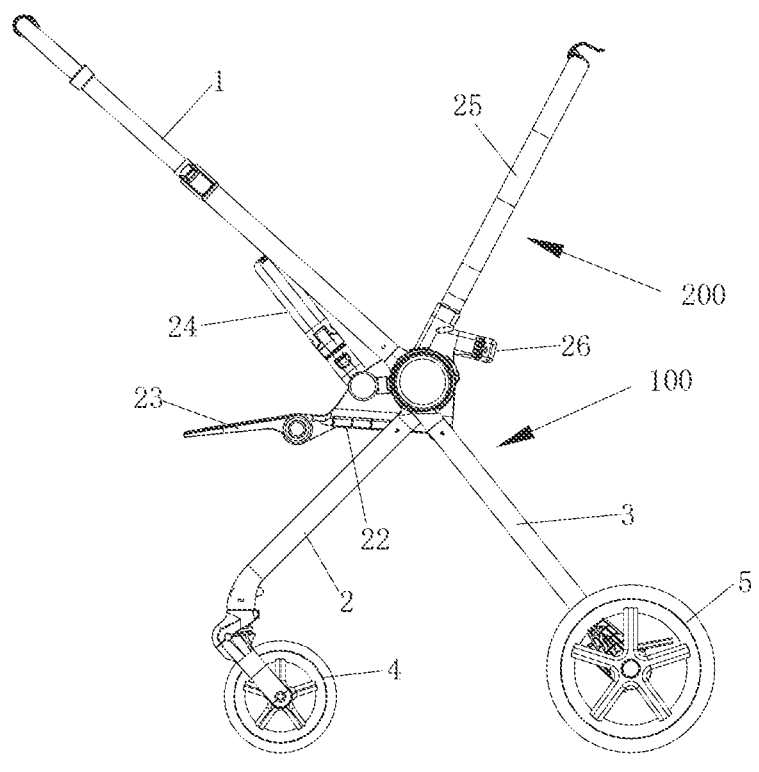
FIG. 26 is a schematic side view of a stroller equipped with the seat frame and in the unfolded configuration according to an embodiment of the present application in a case where the push rod is in the reverse use state and the seat frame is installed forward.
Figure 27:
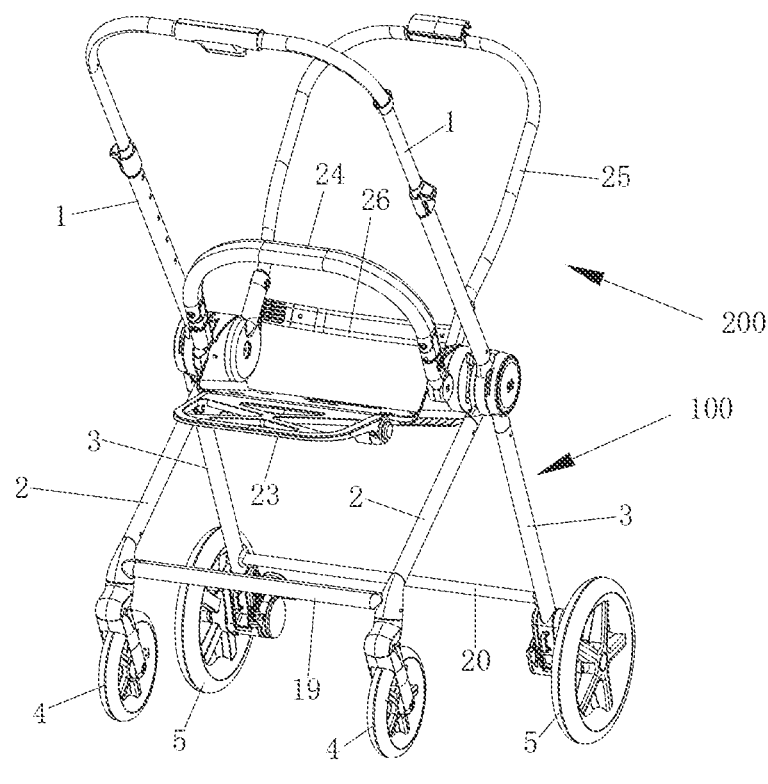
FIG. 27 is a schematic three-dimensional structural diagram of the stroller equipped with the seat frame and in the unfolded configuration according to an embodiment of the present application in a case where the push rod is in the reverse use state and the seat frame is installed forward.
Figure 28:
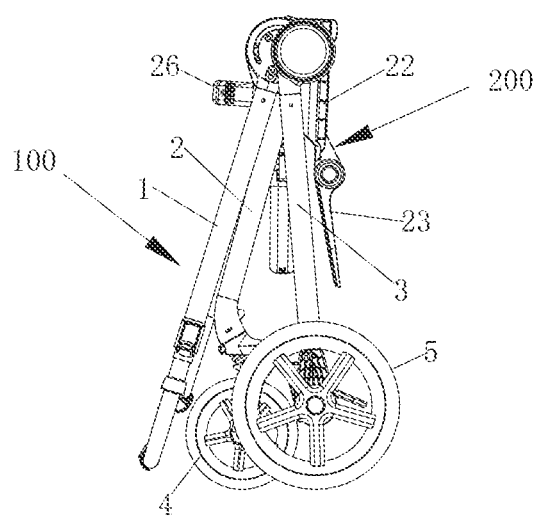
FIG. 28 is a schematic side view of the stroller equipped with the seat frame and in the second folded configuration according to an embodiment of the present application in a case where the push rod is in the reverse use state and the seat frame is installed forward.
Figure 29:
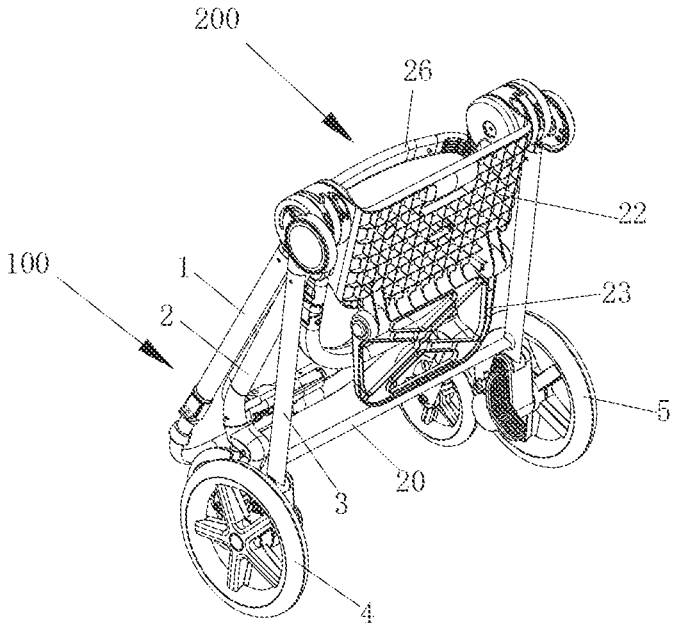
FIG. 29 is a schematic three-dimensional structural diagram of the stroller equipped with the seat frame and in the second folded configuration according to an embodiment of the present application in a case where the push rod is in the reverse use state and the seat frame is installed forward.

Referring to FIGS. 26-27, the push rod 1 is in the reverse use state and the seat frame is installed forward. To fold the stroller up, you need to unlock the stroller frame 100 and press down the push rod 1 to drive the push rod 1 to rotate relative to the front bracket 2, and the rear bracket 3 is linked to rotate closer to the front bracket 2, thus completing the folding operation of the stroller frame 100 finally. In the meanwhile, the backrest rod 25 of the seat frame 200 is folded toward the front bracket 2 to fold the seat frame 200 up. The folded stroller is shown in FIGS. 28-29, in which the push rod 1, the front bracket 2 and the rear bracket 3 are close to each other, and the push rod 1, the front bracket 2 and the rear bracket 3 are arranged in sequence; the backrest rod 25, the armrest rod 24 and the seat plate 22 are close to each other, and the backrest rod 25, the armrest rod 24 and the seat plate 22 are arranged in sequence. After folding up, the seat frame 200 and the stroller frame 100 are close to each other, and the backrest rod 25 is arranged close to the push rod 1 and away from the rear bracket 3.

Figure 30:
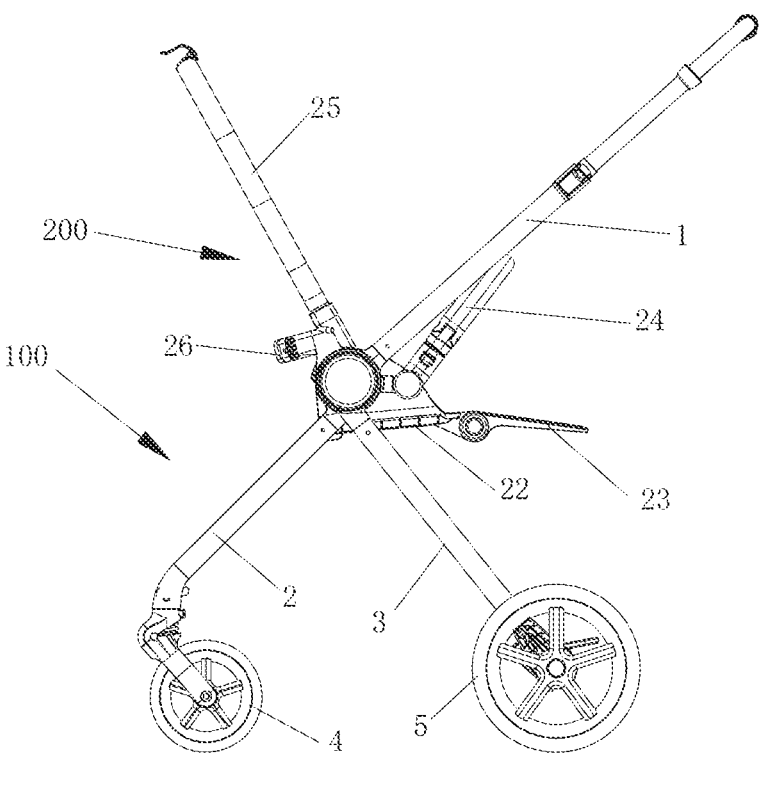
FIG. 30 is a schematic side view of the stroller equipped with the seat frame and in the unfolded configuration according to an embodiment of the present application in a case where the push rod is in the forward use state and the seat frame is installed reversely.
Figure 31:
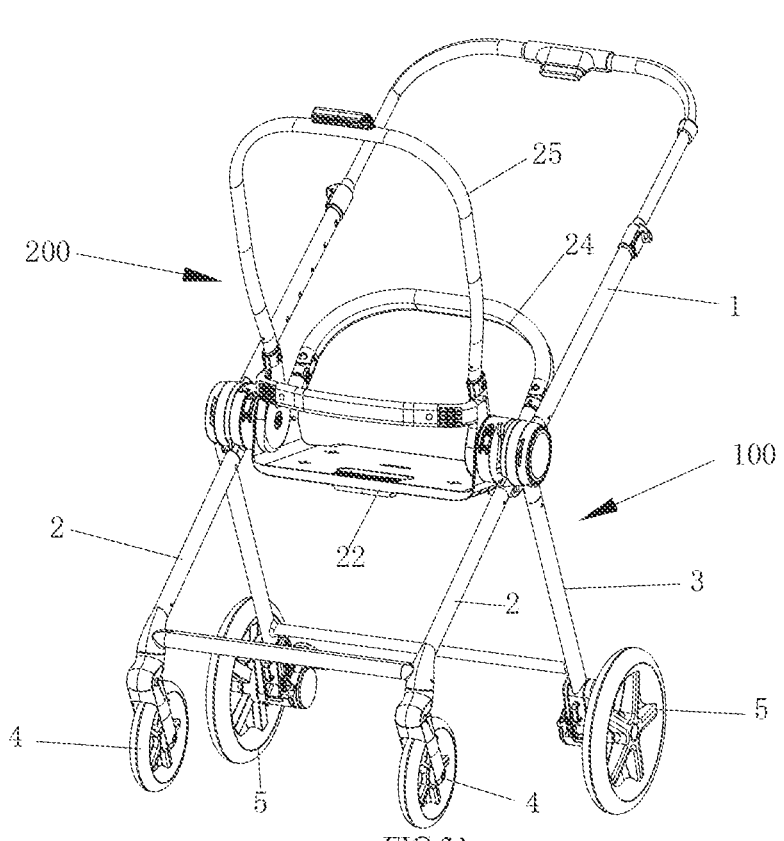
FIG. 31 is a schematic three-dimensional structural diagram of the stroller equipped with the seat frame and in the unfolded configuration according to an embodiment of the present application in a case where the push rod is in the forward use state and the seat frame is installed reversely.

Referring to FIGS. 30-31, the push rod 1 is in the forward use state and the seat frame 200 is installed reversely. As shown in FIG. 30, the armrest rod 24 is located behind the backrest rod 25, the support plate 23 is located behind the seat plate 22, the backrest rod 25 extends from top to bottom along the front-rear direction of the stroller.

Figure 32:
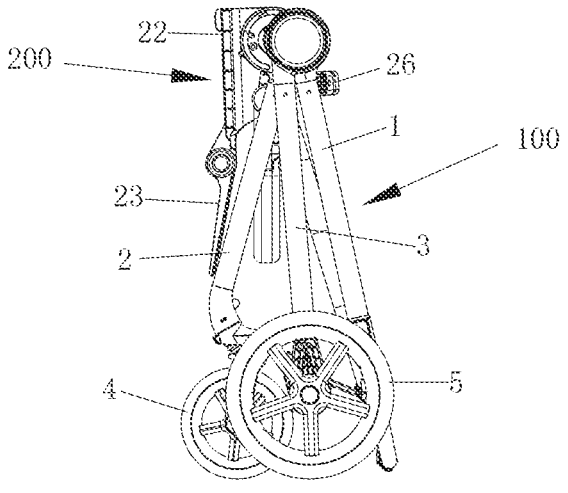
FIG. 32 is a schematic side view of the stroller equipped with the seat frame and in the first folded configuration according to an embodiment of the present application in a case where the push rod is in the forward use state and the seat frame is installed reversely.
Figure 33:
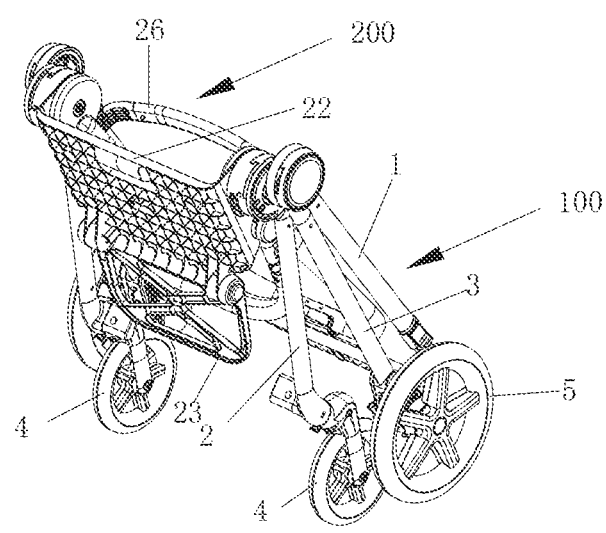
FIG. 33 is a schematic three-dimensional structural diagram of the stroller equipped with the seat frame and in the first folded configuration according to an embodiment of the present application in a case where the push rod is in the forward use state and the seat frame is installed reversely.

To fold the stroller up, you need to unlock the stroller frame 100 and press down the push rod 1 to drive the push rod 1 to rotate closer to the rear bracket 3, and the front bracket 2 is linked to rotate closer to the rear bracket 3, thus completing the folding operation of the stroller frame 100 finally. In the meanwhile, the backrest rod 25 of the seat frame 200 is folded toward the rear bracket 3 to fold the seat frame 200 up. The folded stroller is shown in FIGS. 32-33, in which the push rod 1, the front bracket 2 and the rear bracket 3 are close to each other, and the front bracket 2, the rear bracket 3 and the push rod 1 are arranged in sequence; the backrest rod 25, the armrest rod 24 and the seat plate 22 are close to each other, and the seat plate 22, the armrest rod 24 and the backrest rod 25 are arranged in sequence. After folding up, the seat frame 200 and the stroller frame 100 are close to each other, and the backrest rod 25 is arranged close to the push rod 1 and away from the front bracket 2.

Figure 34:
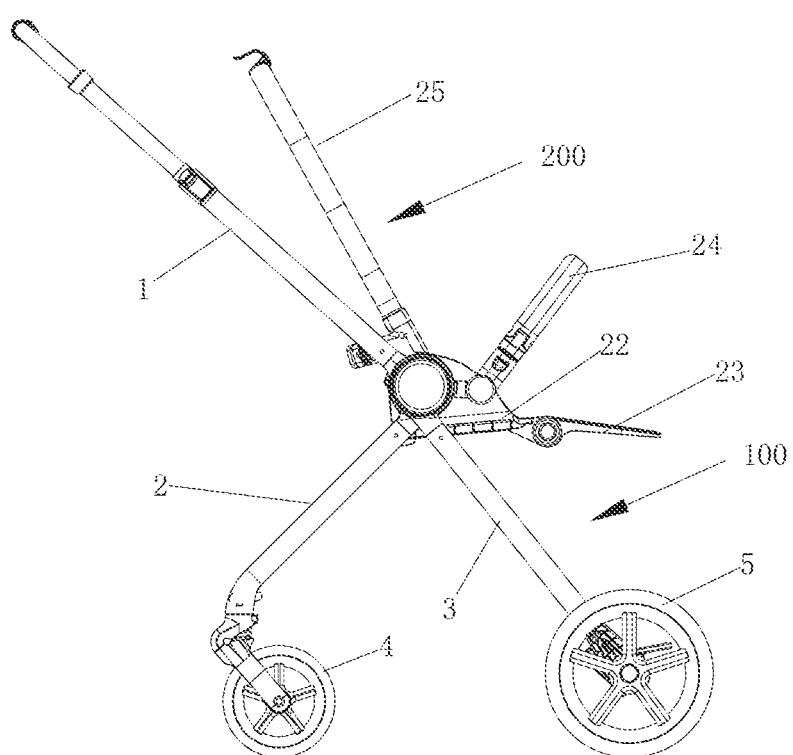
FIG. 34 is a schematic side view of the stroller equipped with the seat frame and in the unfolded configuration according to an embodiment of the present application in a case where the push rod is in the reverse use state and the seat frame is installed reversely.
Figure 35:
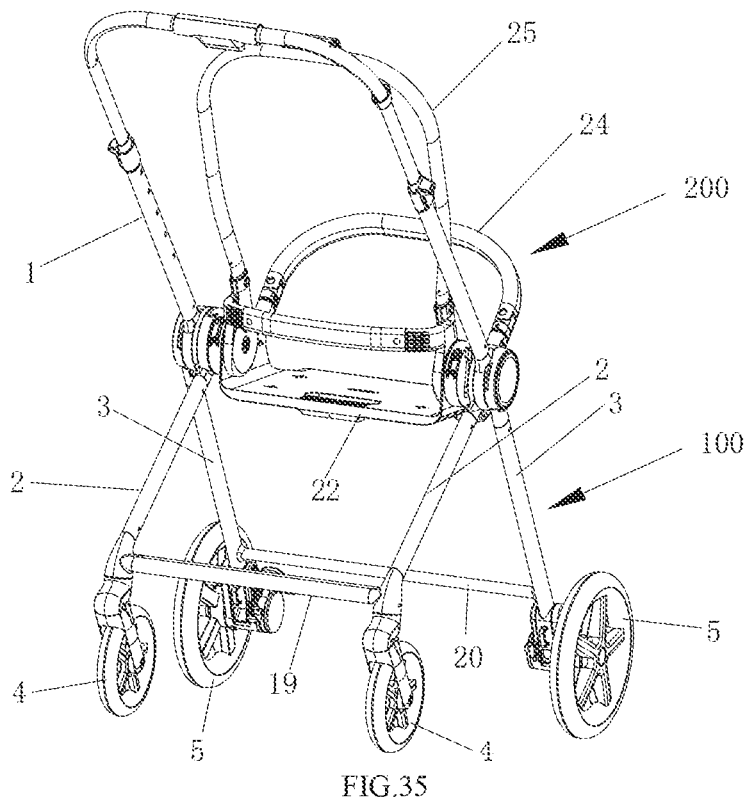
FIG. 35 is a schematic three-dimensional structural diagram of the stroller equipped with the seat frame and in the unfolded configuration according to an embodiment of the present application in a case where the push rod is in the reverse use state and the seat frame is installed reversely.

Referring to FIGS. 34-35, the push rod 1 is in the reverse use state and the seat frame is installed reversely. To fold the stroller up, you need to unlock the stroller frame 100 and press down the push rod 1 to drive the push rod 1 to rotate closer to the front bracket 2, and the rear bracket 3 is linked to rotate closer to the front bracket 2, thus completing the folding operation of the stroller frame 100 finally. In the meanwhile, the backrest rod 25 of the seat frame 200 is folded toward the rear bracket 3 to fold the seat frame 200 up. The folded stroller is shown in FIGS. 36-37, in which the push rod 1, the front bracket 2 and the rear bracket 3 are close to each other, and the push rod 1, the front bracket 2 and the rear bracket 3 are arranged in sequence; the backrest rod 25, the armrest rod 24 and the seat plate 22 are close to each other, and the seat plate 22, the armrest rod 24 and the backrest rod 25 are arranged in sequence. After folding up, the seat frame 200 and the stroller frame 100 are close to each other, and the backrest rod 25 is arranged close to the rear bracket 3 and away from the push rod1.

To sum up, by the above arrangement, the stroller can be folded and unfolded in a linked mode regardless of whether the push rod 1 is in the forward use state or in the reverse use state, and the stroller can be pushed to move forward regardless of whether the push rod 1 is in the forward use state or in the reverse use state. The stroller frame 100 is equipped with the seat frame 200, and the seat frame 200 can be installed forward or reversely. Regardless of whether the seat frame 200 is installed forward or reversely, the stroller can be folded up and the folding operation of the stroller frame 100 will not be affected.

To be noted, the rotating joint of the present application is not limited to the use for the rotary connection of the rods on the stroller frame 100. It also can be used for the rotary connection of multiple rods on products such as child seats, cribs and rocking chairs, to adjust the working positions of certain rods on these products to obtain different functions.

The above embodiments are only to illustrate the technical concept and features of the present application, and their purpose is to enable those familiar with the art to understand the content of the application and implement the application accordingly. They cannot limit the scope of the application. All equivalent changes or modifications made according to the spirit of the present application should be covered within the protection scope of the present application.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A rotating joint, comprising:
a base;
a first connecting base; and
a second connecting base, wherein the first connecting base and the second connecting base are rotatably connected by a first rotating shaft, a second rotating shaft is further provided between the first connecting base, the second connecting base and the base,
wherein an axis of the first rotating shaft and an axis of the second rotating shaft are arranged in parallel, a first linkage unit is provided between the first connecting base and the base, and a second linkage unit is provided between the second connecting base and the base;
wherein, when the base rotates, relative to the second connecting base, around the second rotating shaft in a first direction, the first linkage unit coordinates with the first connecting base to rotate, relative to the second connecting base, around the first rotating shaft in a second direction which is opposite to the first direction;
wherein, when the base rotates, relative to the first connecting base, around the second rotating shaft in the second direction, the second linkage unit coordinates with the second connecting base to rotate, relative to the first connecting base, around the first rotating shaft in the first direction.

2. The rotating joint according to claim 1, wherein the first linkage unit comprises a first pin provided on the base and a first sliding groove formed in the first connecting base, the first pin is slidably and rotatably inserted in the first sliding groove, and an axis of the first pin is arranged parallel to the axis of the first rotating shaft or the axis of the second rotating shaft; and/or, the second linkage unit comprises a second pin provided on the base and a second sliding groove formed in the second connecting base, the second pin is slidably and rotatably inserted in the second sliding groove, and an axis of the second pin is arranged parallel to the axis of the first rotating shaft or the axis of the second rotating shaft.

3. The rotating joint according to claim 2, wherein the first pin is fixedly provided on the base, a first groove is formed in the first connecting base at a position corresponding to the first pin and along a rotationally extending direction of the first pin, and an end of the first groove is connected with an end of the first sliding groove; and/or, the second pin is fixedly provided on the base, a second groove is formed in the second connecting base at a position corresponding to the second pin and along a rotationally extending direction of the second pin, and an end of the second groove is connected with an end of the second sliding groove.

4. The rotating joint according to claim 3, wherein the first groove and the second groove are respectively located above the first rotating shaft.

5. The rotating joint according to claim 3, wherein when the base rotates relative to the second connecting base, the first pin relatively slides and rotates in the first sliding groove to drive the first connecting base to rotate relative to the second connecting base, and the second pin slides in the second groove along a longitudinal direction of the second groove; when the base rotates relative to the first connecting base, the second pin relatively slides and rotates in the second sliding groove to drive the second connecting base to rotate relative to the first connecting base, and the first pin slides in the first groove along a longitudinal direction of the first groove.

6. The rotating joint according to claim 2, wherein the first pin and the second pin are respectively located on two sides of the second rotating shaft, and the first pin and the second pin are also respectively located on two sides of the base; and/or, the first sliding groove and the second sliding groove are respectively located above the first rotating shaft.

7. The rotating joint according to claim 2, wherein on a plane perpendicular to an axis extending direction of the first rotating shaft, a center of the first pin, a center of the second rotating shaft, and a center of the second pin are in a same straight line.

8. The rotating joint according to claim 1, wherein second rotating shaft penetrates through the base and is fixed to the base.

9. The rotating joint according to claim 1, wherein an axis extending direction of the first rotating shaft, the first connecting base, the base, and the second connecting base are arranged in sequence.

10. The rotating joint according to claim 1, wherein the first rotating shaft is located under the second rotating shaft.

11. The rotating joint according to claim 1, wherein the second rotating shaft is fixedly provided on the base, an arc-shaped first limiting groove having a center of a circle defined by the axis of the first rotating shaft is provided on the first connecting base at a position corresponding to the second rotating shaft, and an arc-shaped second limiting groove having a center of a circle defined by the axis of the first rotating shaft is provided on the second connecting base at a position corresponding to the second rotating shaft; when the base rotates relative to the second connecting base, the second rotating shaft slides in the first limiting groove along a longitudinal direction of the first limiting groove, and the second rotating shaft always pushes against one end of the second limiting groove; when the base rotates relative to the first connecting base, the second rotating shaft slides in the second limiting groove along a longitudinal direction of the second limiting groove, and the second rotating shaft always pushes against one end of the first limiting groove.

12. The rotating joint according to claim 11, wherein the first limiting groove and the second limiting groove are respectively located above the first rotating shaft.

13. A stroller, comprising a stroller frame having a folded configuration and an unfolded configuration, a front wheel assembly arranged in front of a bottom of the stroller frame, and a rear wheel assembly arranged behind the bottom of the stroller frame, the stroller frame comprising a push rod, a front bracket with the front wheel assembly at the bottom, and a rear bracket with the rear wheel assembly at the bottom, wherein the push rod, the front bracket and the rear bracket are connected by the rotating joint according to claim 1, wherein the base is provided at a lower part of the push rod, and the first connecting base is provided at an upper part of the front bracket, and the second connecting base is provided at an upper part of the rear bracket.

14. The stroller according to claim 13, wherein the push rod has a forward use state and a reverse use state; the stroller frame has a first folded configuration after being folded from the forward use state of the push rod and a second folded configuration after being folded from the reverse use state of the push rod; when folding from the forward use state of the push rod, the push rod is driven to rotate closer to the rear bracket and the base rotates relative to the second connecting base; the first linkage unit then coordinates with the first connecting base to rotate relative to the second connecting base, thereby the front bracket rotates closer to the rear bracket; and when the stroller frame is in the first folded configuration, the push rod and the rear bracket are located behind the front bracket in a front-rear direction; when folding from the reverse use state of the push rod, the push rod is driven to rotate closer to the front bracket, the second linkage unit coordinates with the second connecting base to rotate relative to the first connecting base, thereby the rear bracket rotates closer to the front bracket; and when the stroller frame is in the second folded configuration, the push rod and the front bracket are located in front of the rear bracket in the front-rear direction.

15. The stroller according to claim 13, wherein in a left-right direction of the stroller, the first connecting base, the base, and the second connecting base are arranged in sequence.

16. A child product, comprising a base rod, a first bracket rod and a second bracket rod, wherein the base rod, the first bracket rod and the second bracket rod are connected by the rotating joint according to claims 1, wherein one of the base rod, the first bracket rod and the second bracket rod is provided with the base, one of the other two rods of the base rod, the first bracket rod and the second bracket rod is provided with the first connecting base, the other one of the other two rods of the base rod, the first bracket rod and the second bracket rod is provided with the second connecting base, and the rod with the base is located between the rod with the first connecting base and the rod with the second connecting base.

17. The child product according to claim 16, wherein the base rod is provided with the base, the first bracket rod is provided with the first connecting base, the second bracket rod is provided with the second connecting base, and the first bracket rod and the second bracket rod are respectively located on two opposite sides of the base rod.

18. The child product according to claim 16, wherein the child product is a stroller, a child seat, a crib, or a rocking chair.

* * * * *